United States Patent
Kondo et al.

[11] Patent Number: 5,852,470
[45] Date of Patent: Dec. 22, 1998

[54] SIGNAL CONVERTING APPARATUS AND SIGNAL CONVERTING METHOD

[75] Inventors: Tetsujiro Kondo; Yasuhiro Fujimori; Hideo Nakaya; Kenji Takahashi, all of Kanagawa, Japan

[73] Assignee: Sony Corporation, Tokyo, Japan

[21] Appl. No.: 654,205

[22] Filed: May 28, 1996

[30] Foreign Application Priority Data

May 31, 1995 [JP] Japan .................................. 7-158616

[51] Int. Cl.$^6$ .................................................. H04N 7/01
[52] U.S. Cl. ........................... 348/448; 348/458; 382/300
[58] Field of Search .................................. 348/448, 458, 348/441, 447, 459, 412; 382/300

[56] References Cited

U.S. PATENT DOCUMENTS

| | | | |
|---|---|---|---|
| 4,937,667 | 6/1990 | Choguet et al. | 348/448 |
| 5,404,174 | 4/1995 | Sugahara | 348/412 |
| 5,406,334 | 4/1995 | Kondo et al. | 348/581 |
| 5,459,519 | 10/1995 | Scallise et al. | 348/431 |
| 5,469,216 | 11/1995 | Takahashi et al. | 348/441 |
| 5,517,588 | 5/1996 | Kondo | 382/300 |
| 5,546,130 | 8/1996 | Hackett et al. | 348/447 |

*Primary Examiner*—Victor R. Kostak
*Attorney, Agent, or Firm*—Frommer Lawrence & Haug, LLP; William S. Frommer

[57] ABSTRACT

A signal converting apparatus and a signal converting method which predictively produce highly accurate interpolated pixels in accordance with a classification which precisely reflects a variety of signal characteristics of inputted video signals to provide a high resolution video signal. An activity is evaluated and classified for each block of an inputted video signal ($S_1$), and stepwise classifications are executed on each block of the inputted video signal ($S_1$) in accordance with an activity code (c0) obtained as a result of the activity classification. In this way, the accuracy of subsequent classifications can be increased, reflecting the activity characteristic of each block of the inputted video signal ($S_1$), thus achieving, as a whole, a highly accurate classification of the inputted video signal ($S_1$). Appropriate prediction coefficients (d1) are read based on the activity code (c0) and a class code (c1) for each block of the inputted video signal ($S_1$) to produce highly accurate interpolated pixels, thus providing a high resolution video signal ($S_2$).

55 Claims, 22 Drawing Sheets

◎ : REMARKED SD PIXEL
○ : SD PIXELS

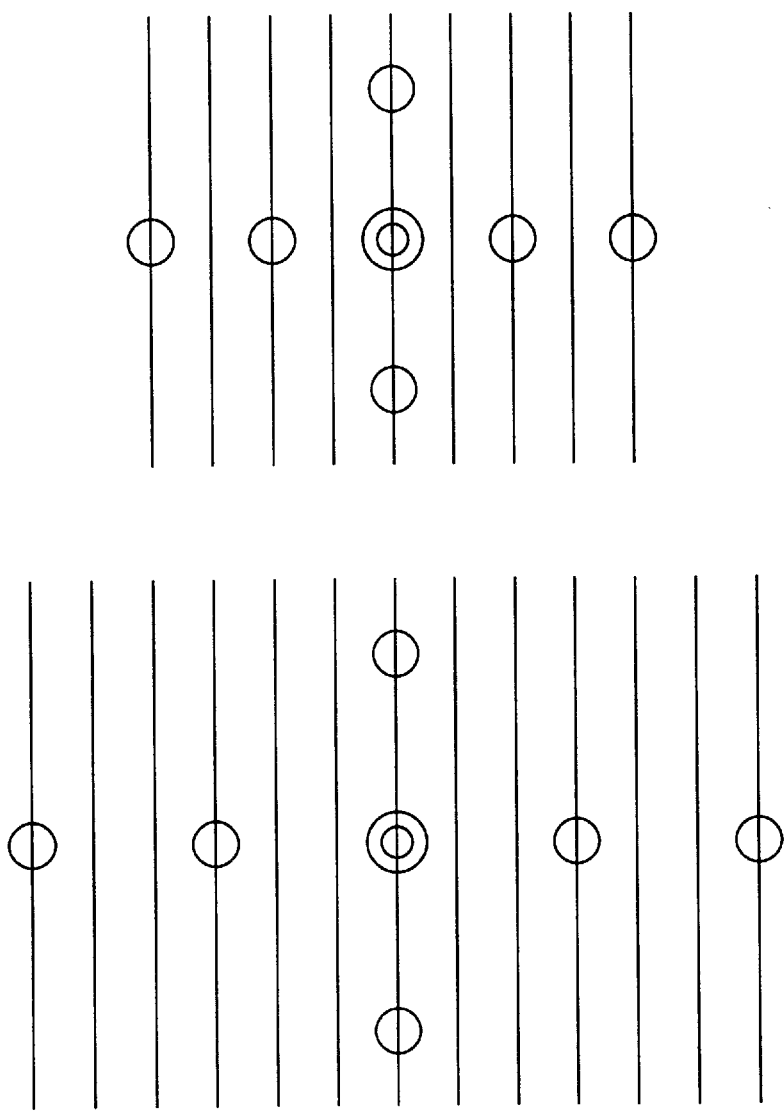

|  | CLASS | | PREDICTION COEFFICIENTS |
|---|---|---|---|
| 0 | 0 | 0,0 | |
|  | 1 | 0,1 | |
|  | ⋮ | ⋮ | ⋮ |
| 1 | | | |
|  | | | ⋮ |
| 2 | | | |
|  | | | ⋮ |

CLASS c0  CLASS c1  CLASS d0

FIG. 15 A  LAPLACIAN FILTER 51A
HORIZONTAL DIRECTION

| -1 | 2 | -1 |

FIG. 15 B  LAPLACIAN FILTER 51B
VERTICAL DIRECTION

| -1 |
| 2 |
| -1 |

FIG. 15 C  LAPLACIAN FILTER 51C
RIGHTWARDLY DECLINING
OBLIQUE DIRECTION

FIG. 15 D  LAPLACIAN FILTER 51D
LEFTWARDLY DECLINING
OBLIQUE DIRECTION

FIG. 15 E  LAPLACIAN FILTER 51E
TEMPORAL DIRECTION

|  | I3 | I2 | I1 | I0 |
|---|---|---|---|---|
| HORIZONTAL DIRECTION | 0 | 0 | 0 | 0 |
|  | 0 | 0 | 0 | 1 |
|  | 0 | 0 | 1 | 0 |
|  | 0 | 0 | 1 | 1 |
| VERTICAL DIRECTION | 0 | 1 | 0 | 0 |
|  | 0 | 1 | 0 | 1 |
|  | 0 | 1 | 1 | 0 |
|  | 0 | 1 | 1 | 1 |
| RIGHTWARDLY DECLINING OBLIQUE DIRECTION | 1 | 0 | 0 | 0 |
|  | 1 | 0 | 0 | 1 |
|  | 1 | 0 | 1 | 0 |
|  | 1 | 0 | 1 | 1 |
| LEFTWARDLY DECLINING OBLIQUE DIRECTION | 1 | 1 | 0 | 0 |
|  | 1 | 1 | 0 | 1 |
|  | 1 | 1 | 1 | 0 |
|  | 1 | 1 | 1 | 1 |

Columns I3, I2: SPATIAL DIRECTION; I1: TEMPORAL MAXIMUM; I0: DIRECTION

SIGNAL CONVERTING APPARATUS AND SIGNAL CONVERTING METHOD

BACKGROUND OF THE INVENTION

1. Field of the Invention

The present invention relates to a signal converting apparatus and signal converting method and, more particularly, is applicable to upconvertors for converting standard definition signals (SD) such as those of NTSC method (the method is determined by committee for examining American method of television -National television system committee-) or the like to high definition signals (HD) such as those of high vision or the like.

2. Description of the Related Art

Heretofore, this type of upconvertors perform frequency interpolation on SD video signals to increase the number of pixels in the SD video signals to produce HD video signals. For example, as shown in FIG. 1, such upconvertors perform double frequency interpolation respectively in the horizontal direction and in the vertical direction on an SD video signal composed of pixels represented by large "○" marks and large "Δ" marks on scanning lines 1 of an HD image to produce an HD video signal composed of pixels represented by small "○" marks and small "Δ" marks.

As an example of performing interpolation using an upconvertor, there is a method which produces HD pixels at four different positions from field data of an SD video signal. For example, taking an SD pixel represented by a mark "◉" in consideration, HD pixels at four different positions mode 1, mode 2, mode 3 and mode 4 in the vicinity of the SD pixel "◉" are produced by interpolation of environmental SD pixels. An intra-space two-dimensional non-separable filter 2 shown in FIG. 2 and a horizontal/vertical separable filter 3 shown in FIG. 3 are used for this operation as interpolation filters.

The two-dimensional non-separable filter 2 employs two-dimensional filters 4A to 4D to independently execute interpolation to generate HD pixels at four positions mode 1, mode 2, mode 3, mode 4, and converts the respective interpolated results into a serial form in a selector 5 to produce an HD video signal.

The horizontal/vertical separable filter 3 executes interpolation for pixels at positions mode 1, mode 3 with a vertical interpolation filter 6A and executes interpolation for pixels at positions mode 2, mode 4 with a vertical interpolation filter 6B to produce data on two scanning lines of an HD video signal. Then, the filter 3 uses horizontal interpolation filters 7A and 7B on the respective scanning lines to interpolate HD pixels at the four positions, and converts the interpolated results into a serial form in a selector 8 to produce an HD video signal.

While the conventional upconvertor as described above employs an ideal filter as an interpolation filter, the spatial definition of a resulting HD video signal remains identical to that of an original SD video signal although the number of pixels are increased in the HD video signal. Also, the conventional upconvertor has a problem that it can only produce an HD video signal having a lower definition than that of an original SD video signal since an ideal filter cannot be used in practice.

As a method for solving the problem mentioned above, a classification adaptive processing method which classifies an inputted SD video signal into several classes on the basis of the characteristics thereof and uses prediction coefficients comprising prediction data previously generated by learning for each class to produce an HD video signal with a high definition is proposed. For example, such method has been proposed by the applicant of this invention in the specification and drawings of U.S. application Ser. No. 08/061,730 filed in May 17, 1993.

However, this classification adaptive processing method implies a problem that a prediction accuracy for the HD video signal produced thereby is degraded unless an appropriate classification is carried out in accordance with the characteristics of an inputted SD video signal when prediction coefficients are generated by learning. In other words, without sufficient classification capability, HD video signals which would essentially classified into different classes may be grouped into the same class. Thus, prediction coefficients generated by learning will predict an average value of HD video signals of different nature, resulting in a degraded definition recovering capability.

SUMMARY OF THE INVENTION

In view of the foregoing, an object of this invention is to provide a signal converting apparatus and signal converting method which are capable of converting lower definition video signals into higher definition video signals by appropriate classifications corresponding to a variety of signal characteristics of inputted video signals.

The foregoing object and other objects of the invention have been achieved by the provision of a signal converting apparatus for converting a first inputted video signal into a second video signal different from the first video signal, comprising: means for evaluating an intra-space activity of the first video signal and outputting an activity code; means for executing stepwise classifications on the basis of the activity code and outputting a class code on the basis of the result of the classification; a prediction coefficient memory for storing prediction coefficients for predictively producing the second video signal by using the first video signal; and means for performing a prediction calculation on the first inputted video signal by using the prediction coefficient read from the prediction coefficient memory in accordance with the activity code and/or the class code to produce the second video signal.

Further, the present invention provides the signal converting apparatus wherein the first video signal is a lower definition video signal, and the second video signal is a higher definition video signal which is higher definition than the lower definition video signal.

Further, the present invention provides the signal converting apparatus wherein the second video signal is a video signal that has the number of pixels more than the first video signal.

Further, the present invention provides the signal converting apparatus wherein the means for producing the activity code evaluates the intra-space activity and activity in a temporal direction of the first video signal to output the activity code.

Furthermore, the present invention provides the signal converting apparatus wherein the means for producing the class code sets a plurality of different pixel patterns to the first video signal, selects a pixel pattern from a plurality of the set pixel patterns in accordance with the activity code, and classifies the first video signal by using the selected pixel pattern to output the class code.

Therefore, an intra-space activity of an inputted video signal is evaluated, and stepwise classifications are executed for the inputted video signal in accordance with the obtained activity code. In this way, subsequent classifications can increase the accuracy, reflecting the intra-space activity characteristic of the inputted video signal. In addition, since the result of the previous classification is reflected to the stepwise subsequent classifications, the classification can be executed with a high accuracy.

Prediction coefficients appropriate to the inputted video signal for each block are read based on at least a class code thus obtained to produce highly accurate interpolated pixels, thus providing a video signal at a higher resolution.

Further, the present invention provides the signal converting apparatus for converting a first inputted video signal into a second video signal different from the first video signal, comprising: means for evaluating the intra-space activity for the first video signal to output an activity code; means for executing stepwise classifications on the basis of the activity code to output a class code on the basis of the result of the classifications; and means, including a prediction value storing memory which stores the prediction value generated as an interpolation pixel signal of the first video signal, for reading and outputting a prediction value in accordance with the activity code and/or the class code.

Further, the present invention provides a signal converting method for converting the inputted first video signal into the second video signal different from the first video signal wherein the intra-space activity of the first video signal is evaluated to output the activity code, stepwise classifications is executed in accordance with the activity code, and a class code is outputted in accordance with the result of the classifications. Then, prediction coefficients stored in the prediction coefficient memory for predictively producing the second video signal by using the first video signal in accordance with the activity code and/or the class code, the prediction calculation is performed on the first inputted video signal using the read prediction coefficients, and a prediction calculation value is outputted as the second video signal.

Furthermore, the present invention provides the signal converting method for converting the inputted first video signal into the second video signal different from the first video signal, wherein the intra-space activity of the first video signal is evaluated to output an activity code, stepwise classifications are executed on the basis of the activity code, a class code is outputted on the basis of the result of the classifications, a prediction value stored in the prediction value memory in accordance with the activity code and/or the class code is read, and the prediction value produced as the interpolation pixel signal of the first video signal is outputted.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 8A, 8B and 8C are schematic diagrams showing class tap patterns for classification unit;

FIGS. 15A, 15B, 15C, 15D and 15E are schematic diagrams explaining one-dimensional Laplacian filters;

FIG. 16 is a table explaining indexes for a class code of first-step classification unit;

DETAILED DESCRIPTION OF THE EMBODIMENT

Preferred embodiments of this invention will be described with reference to the accompanying drawings:

(1) First Embodiment

Figure 4:
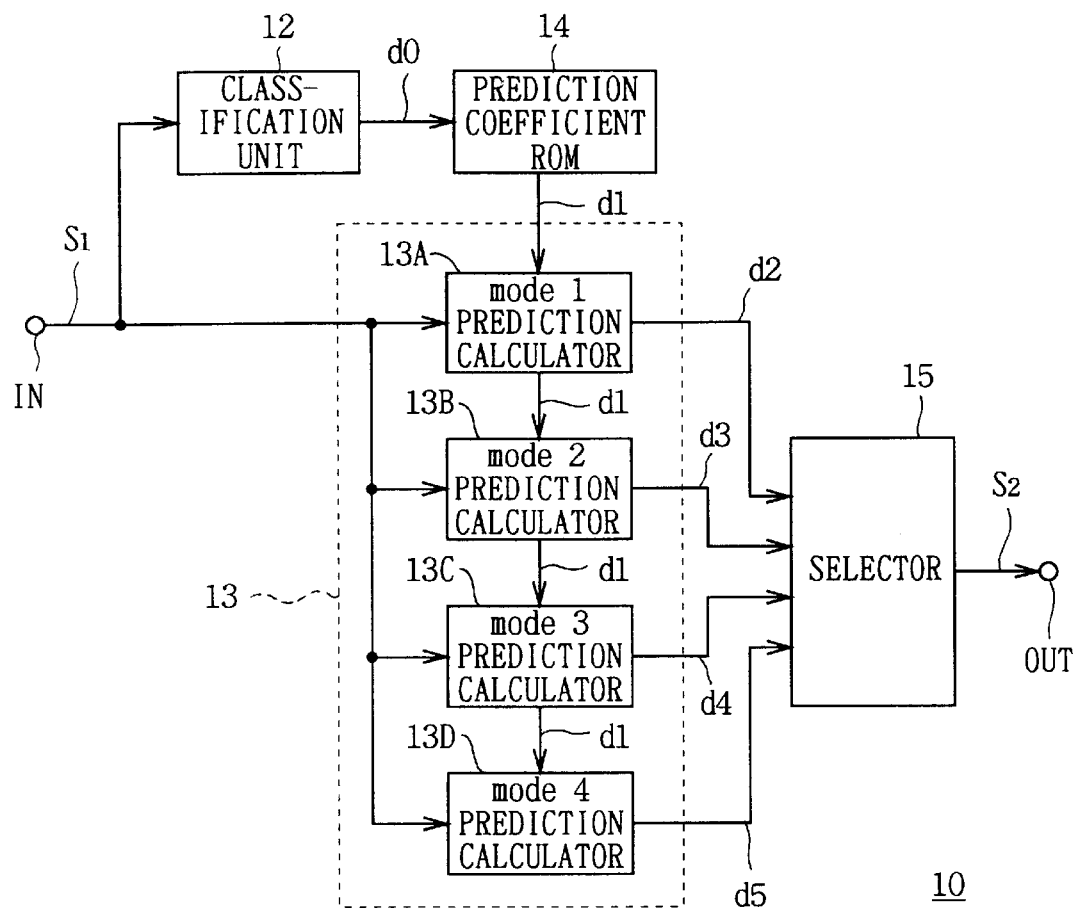
FIG. 4 is a block diagram showing an upconvertor comprising a two-dimensional non-separable filter according to the present invention.

FIG. 4 shows as a whole which employs a two-dimensional non-separable filter utilizing classification adaptive processing to produce an HD video signal from an SD video signal. An SD video signal $S_1$ inputted to the upconvertor 10 through an input terminal IN is supplied to a classification unit 12 in a block-by-block scheme composed of predetermined number of pixels in which a remarked SD pixel is the center of the pixels, then the SD video signal $S_1$ is supplied to a prediction calculation unit 13. The classification unit 12 generates a class code d0 of the remarked SD pixel on the basis of the characteristics of the SD pixels of the SD video signal $S_1$ in the vicinity of the remarked pixel of the inputted SD video signal $S_1$. The class code d0 is output as address data to a prediction coefficient ROM (Read Only Memory) 14 which serves as storage means.

The prediction coefficient ROM 14 stores prediction coefficients, which has been previously obtained by learning and which is used to predictively calculate HD interpolated pixels for producing a high definition video signal from a low definition resolution video signal, as prediction data d1 corresponding to the class code d0. The prediction coefficient ROM 14 reads the prediction data d1 using the class code d0 as address data, and supplies it to the prediction calculation unit 13. The prediction calculation unit 13 executes a predetermined prediction calculation on the SD video signal $S_1$ using the prediction data d1 to produce HD interpolated pixels from the SD video signal $S_1$. The SD video signal $S_1$ is supplied via a delay unit which is not shown to the prediction calculation unit 13. A delay time of the delay unit corresponds to the time to finish supplying the prediction data d1 to the prediction calculation unit 13.

The prediction calculation unit 13 is composed of four prediction calculators 13A to 13D. The respective prediction calculators 13A to 13D execute a product sum calculation using the prediction data d1 on the SD video signal $S_1$. Thereby, the prediction calculators 13A to 13D produce prediction values d2, d3, d4, d5 for HD interpolated pixels corresponding to pixels at four different positions mode 1, mode 2, mode 3, mode 4 on a scanning line 1, respectively. The respective HD interpolated pixels d2, d3, d4, d5 produced in the corresponding prediction calculators 13A to 13D are supplied to a selector 15. The selector 15 rearranges the respective prediction values d2, d3, d4, d5 into time-series data, using a buffer memory (not shown), which is then outputted from an output terminal OUT as an HD video signal $S_2$.

Figure 5:
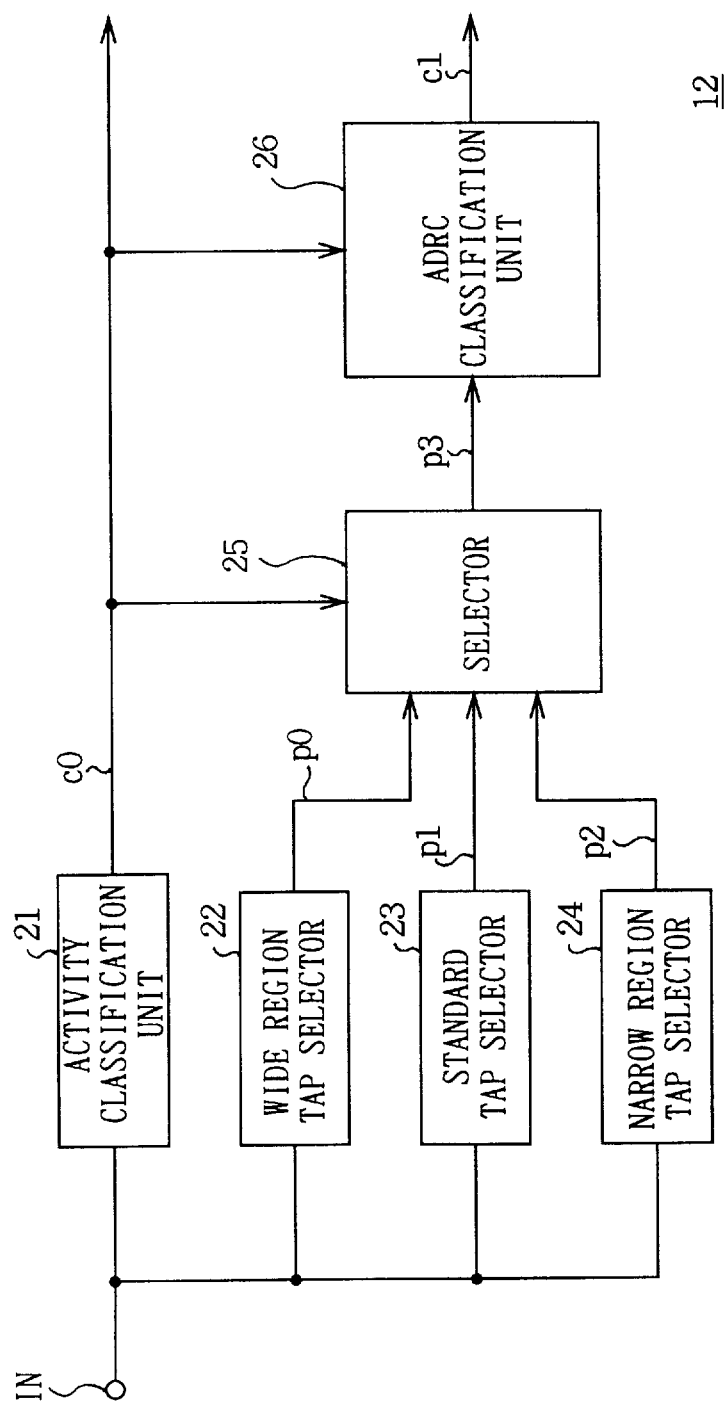
FIG. 5 is a block diagram showing the configuration of a classification unit shown in FIG. 4.

FIG. 5 shows the configuration of the classification unit 12 shown in FIG. 4. As shown in FIG. 5, the SD video signal $S_1$ inputted through an input terminal IN is supplied to an activity classification unit 21. Then, in the activity classification unit 21, for example, the spatial activity is classified for each block composed of 9 pixels of 3×3, with a remarked pixel being centered, to evaluate and determine the characteristics of each block. The activity classification unit 21 produces a class code c0 on the basis of the classification and the evaluation of the spatial activity to output the class code c0 to a selector 25 and an ADRC (adaptive dynamic range coding) classification unit 26.

In addition, the SD video signal $S_1$ is parallelly supplied to a wide region tap selector 22, a standard tap selector 23 and a narrow region tap selector 24 for setting three different types of pixel tap patterns. The wide region tap selector 22, the standard tap selector 23 and the narrow region tap selector 24 each select tap patterns p0, p1, and p2 corresponding to the space classes for the inputted SD video signal $S_1$.

Figure 6:
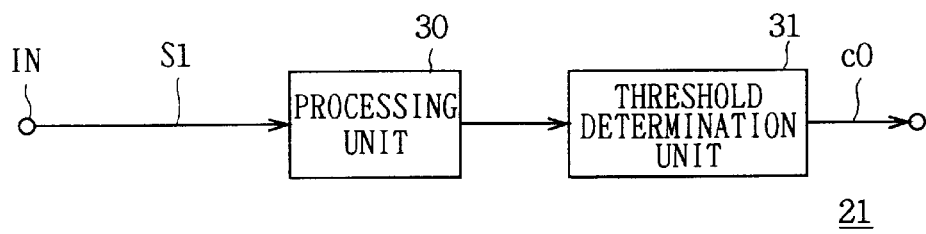
FIG. 6 is a block diagram showing the configuration of an activity determination unit shown in FIG. 5.
Figure 7:
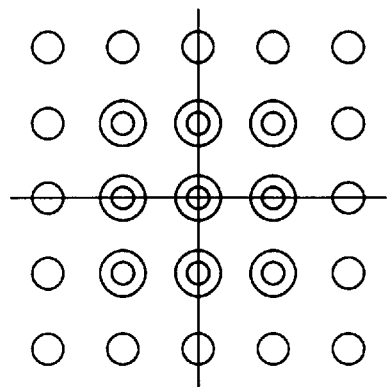
FIG. 7 is a schematic diagram showing an exemplary positioning of SD pixels.

FIG. 6 shows the configuration of the activity classification unit 21 shown in FIG. 5. As shown in FIG. 6, the SD video signal $S_1$ inputted from the input terminal IN is outputted to a processing unit 30 at first. Then, the processing unit 30 detects a dynamic range DR in a plurality of the SD pixels in which the remarked SD pixel is the center of the inputted SD video signal. The dynamic range DR is defined for example, using a maximum value MAX and a minimum value MIN in a neighboring region consisting of nine pixels in which the remarked pixel is the center (shown by "⊙") as shown in FIG. 7 by the following expression (1):

$$DR = MAX - MIN \tag{1}$$

The dynamic range DR of the plurality of the SD pixels in which the remarked SD pixel is the center is output to a threshold determination unit 31. The dynamic range DR is compared with a predetermined threshold in the threshold determination unit 31. As a result, the threshold determination unit 31 outputs a class code c0 produced by comparing the dynamic range with the threshold. In short, the spatial activity is determined by determining the size of the dynamic range by three size (that is, the spatial activity is decided to one of three step of high, middle and low) by the threshold value processing in the threshold determination unit 31. Then the determined result is output as a class code c0 represented by two bits. It is generally thought that the spatial activity is high as the dynamic range DR is large, and the spatial activity is low as the dynamic range DR is small. In this way, the activity classification unit 21 executes a first step of a classification based on the dynamic range.

Next, a next step of a classification in the wide region tap selector 22, the standard tap selector 23, the narrow region tap selector 24 and the ADRC classification unit 26 will be described specifically.

First, among the foregoing three types of class tap pattern selectors, the standard tap selector 23 takes in consideration the standard intra-space variations of the inputted SD video signal $S_1$ and selects an ordinary class tap pattern as shown in FIG. 8B. On the contrary, the wide region tap selector 22 takes in consideration the regular intra-space variations of the inputted SD video signal $S_1$ That is, the wide region tap selector 22 selects a class tap pattern for a wide region as shown in FIG. 8A. Further, the narrow region tap selector 24 takes in consideration the irregular intra-space variations of the inputted SD video signal $S_1$ and selects a class tap pattern for a narrow region as shown in FIG. 8C for the irregular signal variations.

The wide region tap selector 22, the standard tap selector 23 and the narrow region tap selector 24 respectively supply class tap patterns p0, p1 and p2 respectively selected thereby to the selector 25. The selector 25 selects one of the class tap patterns p0, p1 and p2 in response to a class code c0 sent thereto from the activity classification unit 21 as a selection control signal, and supplies the selected class tap pattern as a class tap pattern p3 to the ADRC classification unit 26. That is, the selector 25 selects the class tap pattern p0 from the wide region tap selector 22 when the class code c0 indicates that the spatial activity is low, to the contrary, the selector 25 selects the class tap pattern p2 from the narrow region tap selector 24 when the class code c0 indicates that the spatial activity is high.

The ADRC classification unit 26 sets the number of re-quantization bits "k" in response to the class code c0 which is used as a control signal. The class code c0 has been generated in accordance with the dynamic range DR of the inputted SD video signal $S_1$. In this way, the level resolution capability can be set differently for each tap in the tap pattern p3 selected for a space class, depending upon the dynamic range DR of the SD video signal $S_1$.

The ADRC re-quantizes pixels with a quantization step size defined as the re-quantization. An ADRC code c1 ("ci" is used in the following equation in accordance with the number of SD pixels "i" in the class tap pattern) is represented, using the dynamic range DR, the number of re-quantization bits "k", an SD pixel $x_i$, and a minimum pixel level MIN in its neighboring region, by the following expression:

$$c_i = \frac{x_i - MIN}{\frac{DR}{2^k}} \quad (2)$$

The change of the level resolution capability for a tap pattern of a space class is carried out by changing the number of re-quantization bits "k" in the ADRC calculation represented by expression (2) in accordance with the class code c0. In this way, the level resolution capability can be adaptively changed and set in accordance with the dynamic range DR of an inputted signal. That is, the bigger the dynamic range DR becomes, the more the ADRC classification unit 26 set the level resolution capability in detail.

The classification unit 12 thus generates a class code d0 composed of the class code c0 and an ADRC code c1. The class code d0 is supplied to the prediction coefficient ROM 14 at a subsequent stage as address data.

The prediction coefficient ROM 14 reads the class code d0 composed of a combination of the class code c0 and the ADRC code c1 as address data, and supplies prediction data d1 to be used to produce HD interpolated pixels to the prediction calculation unit 13. The respective prediction calculators 13A to 13D execute a prediction calculation using SD pixels $x_i$ comprising the SD video signal $S_1$ and prediction coefficients $w_i$ comprising prediction data d1 for each class to produce predicted pixels y' for HD interpolated pixels corresponding to the positions mode 1 to mode 4 on the scanning line 1.

Figure 9:
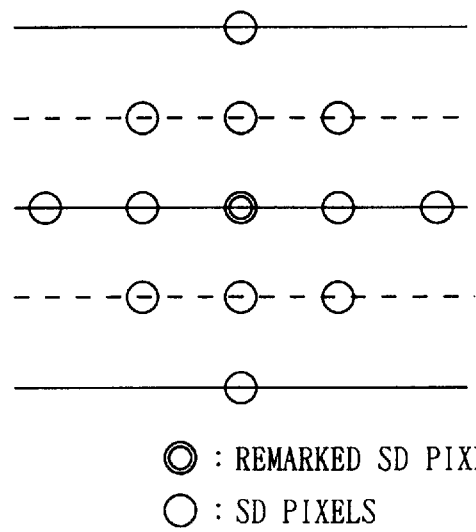
FIG. 9 is a schematic diagram showing the prediction taps of learning data.

The SD pixels $x_i$ used in this event are formed, for example, of thirteen prediction tap data comprising a remarked pixel (indicated by "⊙") and surrounding pixels (indicated by "○") positioned as shown in FIG. 9. Therefore, in this case, the prediction coefficients $w_i$ comprise thirteen prediction coefficients for the respective prediction calculation units. Moreover, the SD pixels used in the respective prediction calculation units 13A to 13D are identical with one another, but the prediction coefficients $w_i$ from the prediction coefficient ROM 14 are different in the respective prediction calculation units 13A to 13D, so that the prediction coefficient ROM 14 stores four groups of the prediction coefficients comprising thirteen prediction coefficients corresponding to one class.

The predicted pixels y' for the HD interpolated pixels are transformed and produced, using the foregoing thirteen SD pixels $x_i$ and the prediction coefficients $w_i$, by the following expression (3):

$$y' = \sum_{i=1}^{i=13} wi \times xi = w1 \times x1 + \ldots + w13 \times x13 \quad (3)$$

The respective prediction calculation units 13A to 13D executes the prediction calculation by the expression (3) using the SD pixels and the prediction coefficients respectively supplied, and produces the HD interpolation pixels.

The prediction coefficients $w_i$ used herein have been previously generated by learning and stored in the prediction coefficient ROM 13.

Next, a learning procedure for generating prediction coefficients for each class stored in the prediction coefficient ROM 14 will be described by referring a flow chart shown in FIG. 10.

Figure 10:
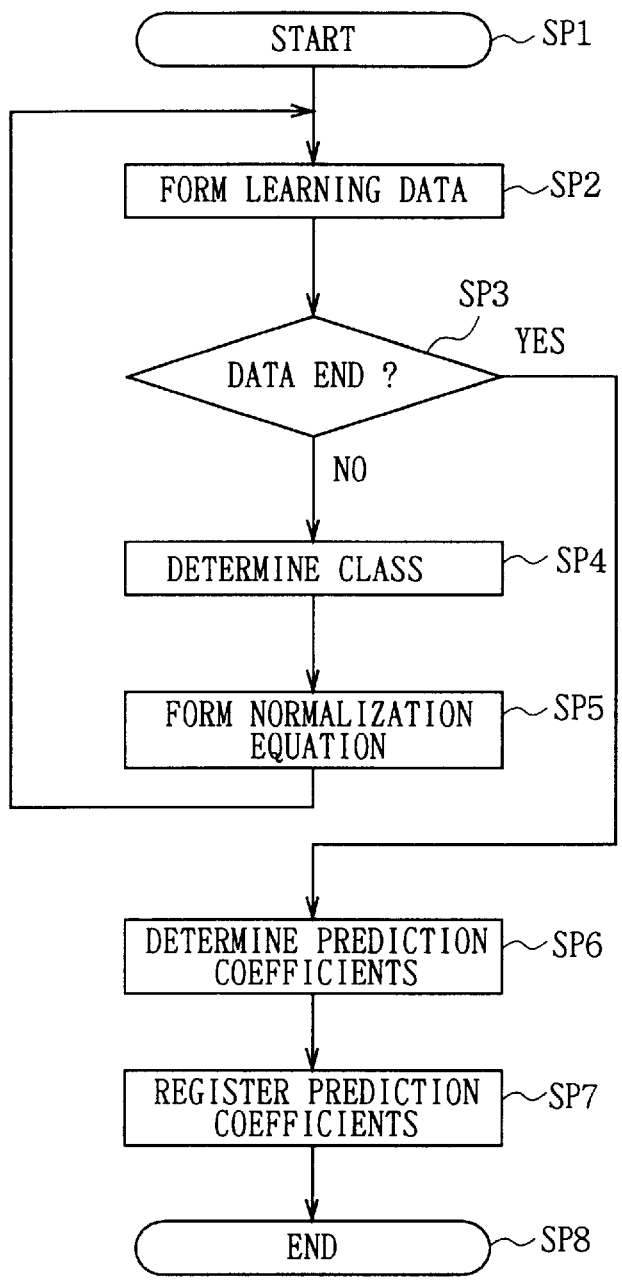
FIG. 10 is a flow chart showing a prediction coefficient learning procedure.

The prediction coefficients are generated in accordance with a prediction coefficient learning procedure shown in FIG. 10. Upon starting the prediction coefficient learning procedure at step SP1, learning data corresponding to previously known images are first generated at step SP2 for learning prediction coefficients $w_i$.

Figure 1:
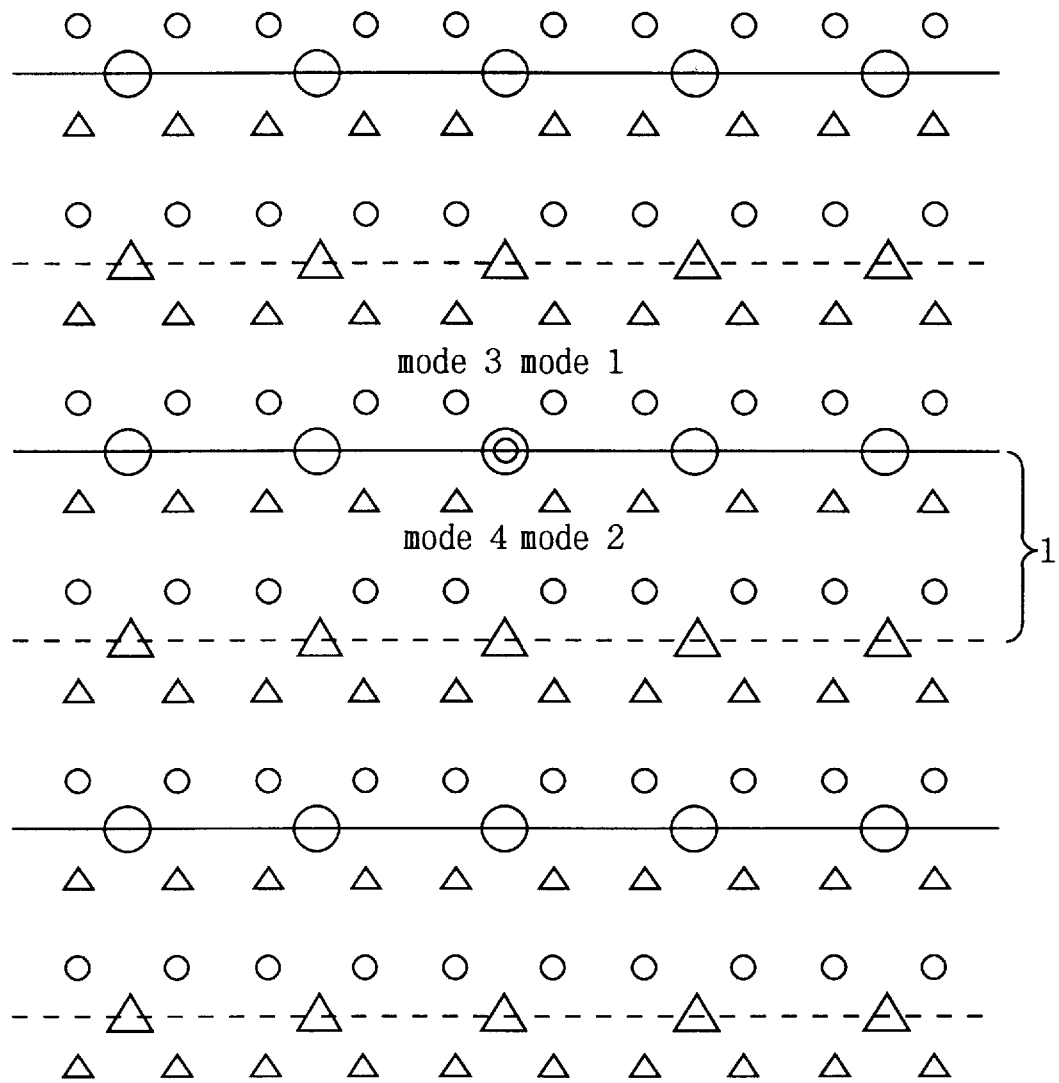
FIG. 1 is a schematic diagram explaining the relation between SD video signal and HD video signal.
Figure 2:
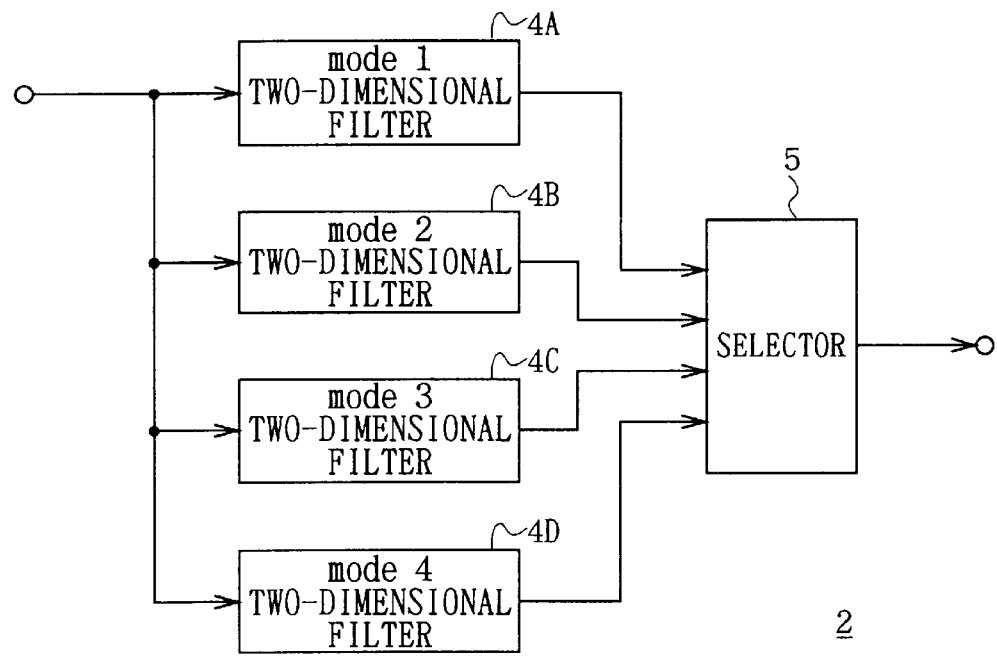
FIG. 2 is a block diagram showing a conventional two-dimensional non-separable interpolation filter.
Figure 3:
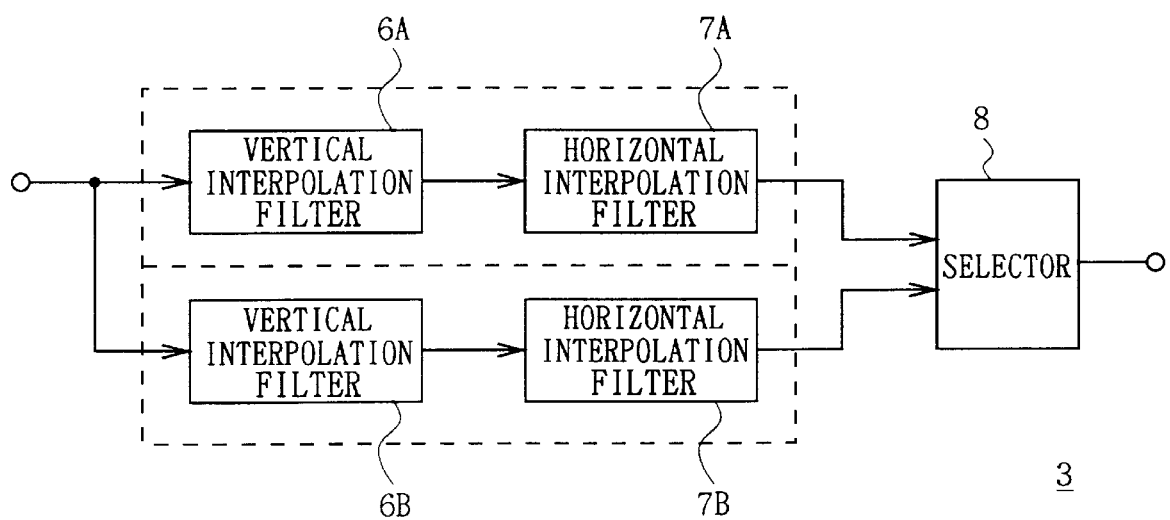
FIG. 3 is a block diagram showing a conventional vertical/horizontal separable interpolation filter.

Specifically, in the HD image shown in FIG. 1, an HD interpolated pixel is designated as an HD remarked pixel, and this HD remarked pixel is expressed by a linear primary combination model using prediction coefficients by a set of learning data comprising surrounding HD interpolated pixels and SD pixels. The prediction coefficients used in this event are calculated using a least squares method for each class. In addition, in generating learning data as described above, if a plurality of images are used, instead of a single image, to generate a multiplicity of learning data, more accurate prediction coefficients can be generated.

It is determined at step SP3 whether or not a sufficient number of learning data have been generated at step SP2 for obtaining the prediction coefficients. If it is determined that the number of generated learning data is less than a required number, the prediction coefficient learning procedure proceeds to step SP4.

At step SP4, class learning data are classified. The classification is performed in such a manner that a local flatness is first detected for learning sampling data, and pixels used for the classification are selected in accordance with the detection results. In this way, pixels exhibiting small changes of the input signal are removed from data to be learned, so that the influence of noise can be eliminated. The classification of the class learning data is carried out by executing the same processing as that used for classifying the inputted SD video signal $S_1$.

Figures 11, 13:
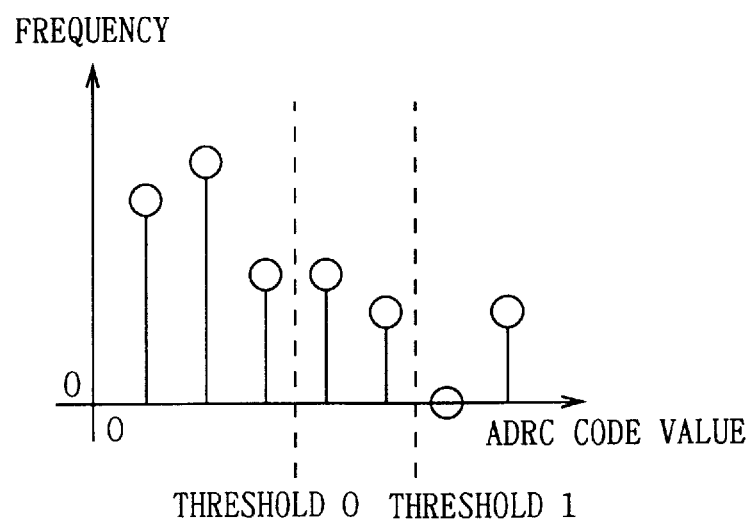
FIG. 11 is a schematic diagram explaining a hierarchical structure in a prediction coefficient ROM.
FIG. 13 is a graph showing a frequency distribution based on the level of ADRC code value.

More specifically, the classification of the class learning data begins with the classification and evaluation of the dynamic range DR of learning data to set a class code c0. Subsequently, a tap pattern p3 is selected from three kinds of wide region, standard and narrow region tap patterns based on the class code c0 as a space class. Then, as shown in FIG. 11, the class code c0 thus generated is combined with an ADRC code c1 to set a class code d0, and this class code d0 is stored in ROM in correspondence to prediction data dl.

Subsequently, the prediction coefficient learning procedure forms at step SP5 a normalization equation for each class based on the classified learning data.

The processing at step SP5 will be specifically explained. However, for generalization, described below is a case where "n" sampling pixels exist as learning data. First, the relationship between pixel levels $x_1, \ldots, x_n$ of respective sampling pixels and a pixel level "y" previous to a sub-sample of a remarked interpolated pixel is expressed for each class by a prediction expression represented by a linear primary combination model using "n" taps of prediction coefficients $w_1, \ldots, w_n$. The prediction expression is given by the following expression (4):

$$y = \sum_{i=1}^{i=n} wi \times xi \quad (4)$$

The prediction coefficients $w_1, \ldots, w_n$ in the expression (4) are calculated to predict the pixel level "y".

Next, an example will be given for showing how to generate the prediction coefficients $w_1, \ldots, w_n$ by a least squares method. The least squares method is applied as follows.

As a generalized example, the following observation expression (5) is considered where X represents a set of input data, "w" a set of prediction coefficients, and "Y" a set of predicted values.

$$XW = Y \tag{5}$$

where, $$X = \begin{pmatrix} x_{11} & x_{12} & \ldots & x_{1n} \\ x_{21} & x_{22} & \ldots & x_{2n} \\ \ldots & \ldots & \ldots & \ldots \\ x_{m1} & x_{m2} & \ldots & x_{mn} \end{pmatrix}, W = \begin{pmatrix} w_1 \\ w_2 \\ \ldots \\ w_n \end{pmatrix}, Y = \begin{pmatrix} y_1 \\ y_2 \\ \ldots \\ y_m \end{pmatrix} \tag{5}$$

The least squares method is applied to data collected by the observation expression given by expression (5). In the example given by expression (5), "n" is equal to "13", and "m" represents the number of learning data.

First, based on the observation expression of the expression (5), the following residual expression (6) is considered:

$$XW = Y + E$$

where, $$E = \begin{pmatrix} e_2 \\ \ldots \\ e_m \end{pmatrix} \tag{6}$$

It can be thought from the residual expression given by the expression (6) that the most probable value of each $w_i$ is derived when a condition for minimizing the solution of the following equation (7) is satisfied.

$$\sum_{i=1}^{m} e_i^2 \tag{7}$$

More specifically, when a partial differential expression by $w_i$ of expression (7) is expressed by the following expression (8):

$$e_1 \frac{\partial e_1}{\partial w_i} + e_2 \frac{\partial e_2}{\partial w_i} + \ldots e_m \frac{\partial e_m}{\partial w_i} = 0 \tag{8}$$

$(i = 1, 2, \ldots, n)$ conditions to the number of "n" are considered based on "i" in the expression (8), and $w_1, w_2, \ldots, w_n$ satisfying these conditions may be calculated. Thus, the following expression (9) is derived from the residual expression (6).

$$\frac{\partial e_i}{\partial w_1} = x_{i1}, \frac{\partial e_i}{\partial w_2} = x_{i2}, \ldots, \frac{\partial e_i}{\partial w_n} = x_{im} \tag{9}$$

$(i = 1, 2, \ldots, n)$

From the expression (9) and the expression (8), the following expression (10) is derived:

$$\sum_{i=1}^{n} e_i x_{i1} = 0, \sum_{i=1}^{n} e_i x_{i2} = 0, \ldots, \sum_{i=1}^{n} e_i x_{im} = 0 \tag{10}$$

Then, from the expression (6) and the expression (10), the following normalization expression (11) is derived:

$$\begin{cases} \left(\sum_{j=1}^{m} x_{j1} x_{j1}\right) w_1 + \left(\sum_{j=1}^{m} x_{j1} x_{j2}\right) w_2 + \ldots + \\ \left(\sum_{j=1}^{m} x_{j1} x_{jn}\right) w_n = \left(\sum_{j=1}^{m} x_{j1} y_j\right) \\ \left(\sum_{j=1}^{m} x_{j2} x_{j1}\right) w_1 + \left(\sum_{j=1}^{m} x_{j2} x_{j2}\right) w_2 + \ldots + \\ \left(\sum_{j=1}^{m} x_{j2} x_{jn}\right) w_n = \left(\sum_{j=1}^{m} x_{j2} y_j\right) \\ \vdots \\ \left(\sum_{j=1}^{m} x_{jn} x_{j1}\right) w_1 + \left(\sum_{j=1}^{m} x_{jn} x_{j2}\right) w_2 + \ldots + \\ \left(\sum_{j=1}^{m} x_{jn} x_{jn}\right) w_n = \left(\sum_{j=1}^{m} x_{jn} y_j\right) \end{cases} \tag{11}$$

Since the number of normalization equations given by the expression (11) equal to the number "n" of unknowns can be formed, the most probable value of each $w_i$ can be calculated from these normalization expression.

The normalization expressions can be solved using a sweeping-out method (Gauss-Jordan's elimination method).

The prediction coefficient learning procedure repeats a loop of steps SP2-SP3-SP4-SP5-SP2 until the same number of the normalization expressions as the number "n" of unknowns are formed for calculating indefinite coefficients $w_1, \ldots, w_n$ for each class.

When the required number of normalization expressions are thus formed, an affirmative result is derived for a determination at step SP3 as to whether or not learning data have been ended, followed by the procedure proceeding to a determination of prediction coefficients at step SP6.

At step SP6, the normalization expressions given by the expression (11) are solved to determine the prediction coefficients $w_1, \ldots, w_n$ for each class. The prediction coefficients thus determined are stored at the next step SP7 in a storage means such as ROM which has its storage area divided for each class. At this case, four group of the prediction coefficients comprising the prediction coefficients $w_1, \ldots, w_n$ respectively corresponding to the prediction calculators 13A to 13D are stored with respect to one class code. By the foregoing learning procedure, the prediction coefficients for the classification predictive processing are generated, followed by the termination of the prediction coefficient learning procedure at the next step SP8.

Next, the operation of the aforementioned upconvertor 10 of the first embodiment and each unit of the upconvertor will be described. An SD video signal $S_1$ inputted to the upconvertor 10 through the input terminal IN is first supplied parallelly to the classification unit 12 and the prediction coefficient calculation unit 13. The classification unit 12 generates a class code d0 based on the SD video signal $S_1$ and supplies the generated class code d0 to the prediction coefficient ROM 14. The prediction coefficient ROM 14 reads prediction data d1 previously obtained by learning in accordance with the class code d0, and supplied it to the prediction coefficient calculation unit 13. The prediction coefficient calculation unit 13 produces HD interpolated pixels corresponding to four positions (mode 1 to mode 4) on a scanning line 1 based on the SD video signal $S_1$ sent from the input terminal IN and the prediction data d1 supplied from the prediction coefficient ROM 14 in the respective prediction calculators 13A to 13D.

In the classification unit 12, the activity classification unit 21 first detects a dynamic range DR of a plurality of SD pixels in which the remarked SD pixel of the inputted SD video signal $S_1$ is the center, and compares the dynamic range DR with a predetermined threshold to output a class code c0. Generally, the spatial activity is high as the dynamic range is large, and conversely, the spatial activity is low as the dynamic range is small.

Meanwhile, the inputted SD video signal $S_1$ in block units is parallelly supplied to the wide region tap selector 22, the standard tap selector 23 and the narrow region tap selector 24 for setting three different pixel tap patterns. And the wide region tap selector 22, the standard tap selector 23 and the narrow region tap selector 24 set tap patterns p0, p1 and p2 for the respective space classes.

The selector 25, based on the class code c0, selects a class tap pattern p0 having a signal change over a relatively wide range as shown in FIG. 8A for an SD video signal $S_1$ having a small dynamic range DR and a low activity in order to reflect a slow signal change to the class. On the other hand, the selector 25 selects a class tap pattern p2 having a signal change over a narrow region as shown in FIG. 8C for an SD video signal $S_1$ having a large dynamic range DR and a high activity in order to express a signal change in a narrow region with a largest possible number of classes. In this way, depending upon the signal characteristics in view of the dynamic range DR, the selector 25 selects and supplies a space class represented by a tap pattern p3 reflecting a signal change of an associated SD video signal $S_1$ to the ADRC classification unit 26 at the next stage.

The ADRC classification unit 26, using the class code c0 as a control signal, sets a small value to the number of re-quantization bits "k" of each tap for the space classification for an SD video signal $S_1$ having a small dynamic range DR. This results in reducing the level resolution capability of each tap, thus outputting an ADRC code c1 on the assumption that the SD video signal $S_1$ is stable. On the other hand, the ADRC classification unit 26 sets a larger value to the number of re-quantization bits "k" of each tap for the space classification for an SD video signal $S_1$ having a large dynamic range DR, in order to output an ADRC code c1 with a higher level resolution capability. In this way, an unstable signal change of the SD video signal $S_1$ having a large dynamic range DR and a high activity can be reflected to the class.

As described above, the classification unit 12 changes a tap pattern of pixels used for the classification in accordance with the dynamic range DR of an inputted SD video signal $S_1$, and also changes the number of re-quantization bits "k" of each tap for the classification to adaptively set the level resolution capability. This can provide an appropriate classification in accordance with the characteristics of the dynamic range of the inputted SD video signal $S_1$.

The classification unit 12 combines the class code c0 with the ADRC code c1 to generate a class code d0 which is supplied to the prediction coefficient ROM 14 at the next stage. In the prediction coefficient ROM 14, prediction data d1 is read based on the class code d0 and supplied to the prediction calculation unit 13. The prediction calculation unit 13 produces HD interpolation pixels by transforming SD pixels into HD interpolation pixels using the prediction data d1. The HD interpolated pixels are supplied to the selector and rearranged time-series at the selector 15 and output as HD video signal. Thus, the selected prediction data d1 reflects the characteristics of the inputted SD video signal $S_1$ in terms of the dynamic range DR, thereby making it possible to improve the accuracy of HD interpolated pixels, produced by transforming SD pixels, and improve the spatial resolution capability of an HD video signal $S_2$.

According to the foregoing embodiment, an SD video signal $S_1$ inputted to the upconvertor 10 undergoes a determination in the activity classification unit 21 as to whether its dynamic range DR is larger or smaller than a threshold value. Then, a tap pattern suitable for the characteristics of the SD video signal $S_1$ in terms of the dynamic range DR can be set from tap patterns for three kinds of space classes (a wide region tap pattern, a standard region tap pattern, or a narrow region tap pattern), based on a class code d0 generated as the result of the determination. It is therefore possible to set a class tap pattern which reflects the characteristics of the inputted SD video signal $S_1$ in terms of the dynamic range DR.

Also, according to the foregoing embodiment, the number of re-quantization bits "k" of each tap for the space classification is changed in accordance with a class code c1 to change the level resolution capability of each tap, thereby making it possible to reflect stable or instable signal changes to the classification by use of the level resolution capability of the tap. In this way, the inputted SD video signal $S_1$ is appropriately classified with a tap pattern and a level resolution capability of the tap set in accordance with the dynamic range DR of the inputted SD video signal $S_1$, making it possible to produce an HD video signal $S_2$ having a high spatial resolution which reflects the signal characteristics of the inputted SD video signal $S_1$.

(2) Second Embodiment

Figure 12:
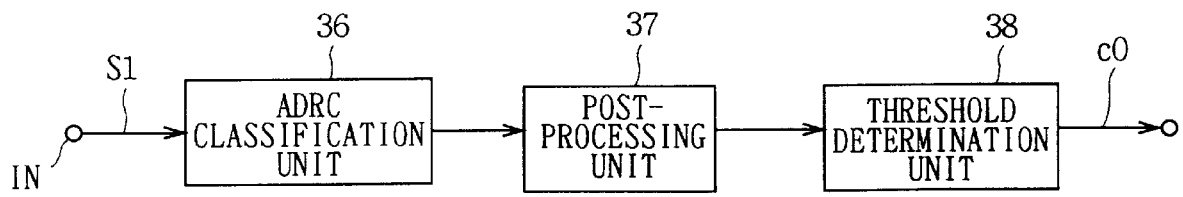
FIG. 12 is a block diagram explaining an activity classification unit in an upconvertor according to a second embodiment.

FIG. 12 shows an activity classification unit 35 of the upconvertor according to a second embodiment. The activity classification unit 35 evaluates an intra-space activity of an SD video signal $S_1$, comprising a plurality of SD pixels in which a remarked pixel is the center, inputted thereto in block units and classifies the remarked pixel in accordance with its characteristics.

The SD signal $S_1$ inputted from an input terminal IN is supplied to the ADRC classification unit 36 which executes a classification based on ADRC for the SD video signal $S_1$ comprising a plurality of the SD pixels in which the remarked pixel is the center.

An ADRC code "c" (It should be noted that $c_i$ is used for the ADRC code c in the expression (12) in order to conform to the number i of SD pixels in a class tap pattern) outputted from the ADRC classification unit 36 is generated from a dynamic range DR, a number of re-quantization bits "k", an SD pixel $x_i$, and a minimum pixel level MIN within a neighboring region of the SD pixel as expressed by the following expression (12):

$$c_i = \frac{xi - \text{MIN}}{\frac{DR}{2^k}} \tag{12}$$

similarly to the first embodiment.

The ADRC code "c" generated in the ADRC classification unit 36 is supplied to a post-processing unit 37 at the next stage. The post-processing unit 37 represents a variation degree of a level distribution pattern indicated by the ADRC code "c", for example, a standard deviation σ for the ADRC code "c" is calculated. And the post-processing unit 37 supplies the calculated standard deviation σ for the ADRC code "c" to a threshold determination unit 38 at the next stage. The threshold determination unit 38 generates and output a class code c0 by comparing the standard deviation a for the ADRC code "c" with a threshold for determination. The standard deviation a for the ADRC code "c" is expressed by the following expression (13) using the ADRC code "ci", an average value "ca" of the ADRC code "ci", and a number of the ADRC code "n".

$$\sigma = \sqrt{\frac{1}{n} \sum_{i=0}^{n-1} (c_i - c_a)^2} \quad (13)$$

The selector 25 shown in FIG. 5 uses the class code c0 thus generated to select a tap pattern p3 for a space class, similarly to the first embodiment. Also, the ADRC classification unit 26 adaptively sets a level resolution of each tap based on the class code c0. In this way, the tap pattern and level resolution are set for the space class based on the result of classifying the spatial activity of the inputted SD video signal $S_1$, thus producing similar effects to the first embodiment.

(3) Third Embodiment

As third embodiment, for classification, the standard deviation σ may be calculated, for example, in view of a data distribution of nine pixels around a remarked pixel of an inputted SD video signal $S_1$ shown in FIG. 7, and generated an class code c0 by a threshold determination for the calculated standard deviation σ.

In other words, in the processor 35 of the activity classification unit 21 shown in FIG. 6, the standard deviation σ is calculated in view of the data distribution of nine pixels around the inputted remarked pixel.

In short, in the processor 35, the SD signal $S_1$ inputted from the input terminal IN is supplied, the standard deviation a is calculated in view of the data distribution of nine pixels around the inputted remarked pixel. And the processor 30 supplies the calculated standard deviation σ to the threshold determination unit 31 at next stage. The threshold determination 38 generates and outputs a class code c0 by a threshold determination of the standard deviation σ. The standard deviation σ is expressed by the following expression (14) using the SD pixels xi, an average value xa in a neighboring region, and a number of pixels "n" in the neighboring region.

$$\sigma = \sqrt{\frac{1}{n} \sum_{i=0}^{n-1} (x_i - x_a)^2} \quad (14)$$

In this way, in the third embodiment, the classification is executed by a threshold determination using this standard deviation σ. In general, the spatial activity is high as the standard deviation is large, and conversely, the spatial activity is low as the standard deviation is small. Therefore, by changing a space class tap pattern and the level resolution capability of a tap for the space classification based on the threshold determination of the standard deviation σ, the same effects as the foregoing embodiments can be obtained.

(4) Fourth Embodiment

Further, as the forth embodiment, a frequency distribution table which registers the values of the ADRC code "c" represented a variation degree of a level distribution pattern indicated by the ADRC code "c" may be produced, and the a class code c0 data may be produced by a threshold determination using the generated frequency distribution table.

More specifically, in a frequency distribution table as shown in FIG. 13, the number of ADRC codes "c" existing between threshold "0" and threshold "1" is counted, and the ratio of pixels existing in this region to pixels existing out of this region is determined for classification. In this case, if the ADRC codes "c" are concentrated, for example, in a particular region, it may be determined that the spatial activity of the SD video signal is low. On the other hand, if the ADRC codes c are widely spread, it may be determined that the spatial activity is high.

In other words, in an ADRC classification unit 36, the SD signal $S_1$ inputted from the input terminal IN is supplied, the plurality of the SD pixels in which the remarked pixel is the center are executed the classification based on the ADRC.

The ADRC code "c" generated in the ADRC classification unit 36 is output to the post-processing unit 37 at the next stage. The post-processing unit 37 generates a frequency distribution table registered an ADRC code "c" as shown in FIG. 13 representing a variation degree of level distribution pattern based on the ADRC code "c". Then the post-processing unit 37 outputs a data representing a frequency distribution table for the generated ADRC code "c" to a threshold determination unit 38 at the next stage. the threshold determination 38 counts the number of ADRC code existing between threshold "0" and threshold "1" in a frequency distribution table, thereby executes a threshold determination, and generates and outputs a class code c0.

Therefore, a space class tap pattern and a level resolution capability of a tap for the space classification are changed based on the threshold value determination using the frequency distribution table for this ADRC code "c", thereby obtaining the same effects as the foregoing embodiments.

(5) Fifth Embodiment

Further, as the fifth embodiment, absolute values of differences of respective adjacent SD pixel values may be registered in the frequency distribution table so as to produce a class code "c0" by evaluating a spatial activity using the frequency distribution table. In this case, the spatial activity is high as a large number of pixels have large absolute difference values, and conversely, the spatial activity is low as a large number of pixels have small absolute difference values.

An adjacent pixels difference calculation unit for calculating absolute values of differences of respective adjacent pixel values is set instead of the ADRC classification unit 36 in the activity classification unit 35 shown in FIG. 12.

In short, in the adjacent pixels difference calculation unit, an SD signal $S_1$ inputted from the input terminal IN is supplied, and difference between adjacent pixels is calculated on plurality of adjacent SD pixels in which the remarked pixel is the center to generate absolute value of the calculated difference. The absolute difference value generated in the adjacent pixels difference calculation unit is supplied to the post-processing unit 37 at next stage. The post-processing unit 37 produces a frequency distribution table, representing a variation degree of level distribution pattern based on the ADRC code "c", in which absolute difference value has been registered. Then, in the post-processing unit 37, data representing the frequency distribution table for the generated absolute difference value is output to a threshold determination unit 38 at next stage. The threshold determination unit 38 counts the number of pixels existing between threshold "0" and threshold "1" in the frequency distribution table for absolute difference value, thereby a class code c0 is produced and output by executing a threshold determination.

Accordingly, a space class tap pattern and a level resolution of a tap for the space classification are changed on the basis of a threshold determination of the absolute difference values of the adjacent pixels, thereby producing the same effects as the foregoing embodiments.

(6) Sixth Embodiment

Figure 14:
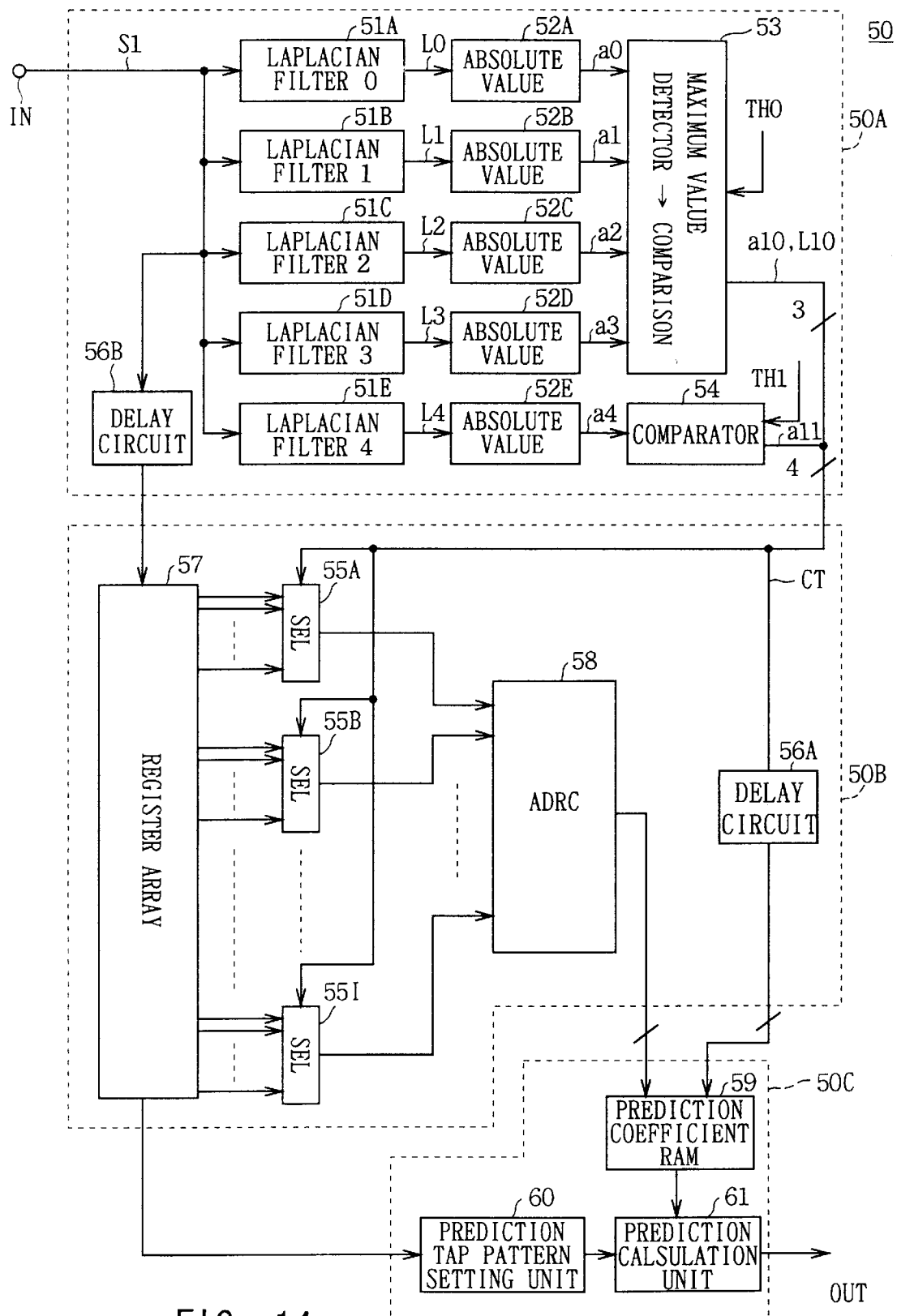
FIG. 14 is a block diagram explaining an upconvertor according to a sixth embodiment.

FIG. 14 shows an upconvertor 50 according to a sixth embodiment. The upconvertor 50 executes a first dimensional laplacian operations in plural directions in laplacian filters 51A to 51E of a first classification unit 50A, and a first-step classification by synthetically deciding the values. A class tap pattern of second classification unit 50B is set according to the classification result of the first classification unit 50A. Then the second classification unit 50B executes a classification using the class tap pattern.

For the sixth embodiment, an activity of temporal direction and spatial direction are evaluated in the first step classification. The structure of the sixth embodiment will be described by using FIG. 14.

An SD video signal $S_1$ supplied from the input terminal IN is supplied to the classification unit 50A. Then the SD video signal $S_1$ supplied to classification unit 50A is supplied to the laplacian filters 51A to 51E and a delay circuit 56B. The five different laplacian filters 51A to 51E perform laplacian operations in different directions from each filter, on each frame or each field of the inputted SD video signal $S_1$, in order to output laplacian values L0 to L4.

More specifically, the Laplacian operations are performed by the one-dimensional Laplacian filters 51A to 51E in the horizontal direction (FIG. 15A), the vertical direction (FIG. 15B), a rightwardly declining oblique direction (the direction of a diagonal extending from the upper left end to the lower right end on the plane of the drawing) (FIG. 15C), a leftwardly declining oblique direction (the direction of a diagonal extending from the upper right end to the lower left end on the plane of the drawing) (FIG. 15D), and a temporal direction (FIG. 15E), as shown in FIGS. 15A to 15E.

Laplacian values L0 to L3 resulting from the Laplacian operations performed by the Laplacian filters 51A to 51D are supplied to absolute value circuits 52A to 52D at the next stage, respectively. The absolute value circuits 52A to 52D calculate absolute values of the respective Laplacian values L0 to L3 supplied thereto. And resulting absolute values a0 to a3 are supplied to a maximum value detector 53. The maximum value detector 53 detects a maximum value from the absolute values a0 to a3, and compares the maximum value with a threshold value TH0. With this operation, a flatness of the inputted SD video signal $S_1$ is detected, a value (flatness values) L10 indicating the flatness represented in one bit is output. Further, the maximum value detector 53 outputs a value (maximum value detecting direction value) a10 indicating a direction which a maximum value represented in two bits is detected. Simultaneously, the laplacian filter 51E outputs a laplacian value L4 in the temporal direction to an absolute value circuit 52E. The absolute value circuit 52E calculates absolute value of the laplacian value L4, and supplies resulting absolute value a4 to a comparator 54. The comparator 54 compares the absolute value a4 with a threshold value TH1, thereby outputs a value (temporal direction changing value) a11 indicating a change in the temporal direction represented in one bit. Four bit data which is a combination of the temporal direction changing value a11, the above-mentioned maximum value a10 and the flatness value L10 is supplied to the classification unit 50B at the next stage as a control signal CT.

Since the laplacian value is basically a total of spatial differences between a remarked pixel and respective pixels on both sides, the laplacian value is larger as adjacent pixels present large changes. The first classification unit 50A performs the one-dimensional laplacian filtering on the activity in a predetermined direction in the space in order to detect a direction in which an edge exists in a space, and roughly classifies its characteristic.

The control signal CT outputted from the classification unit 50A is supplied to selectors 55A to 55I and a delay circuit 56A. The selectors 55A to 55I are connected to a register array 57 through lines to which an SD data selected by the control signal CT is supplied. The register array 57 is supplied with SD video signal $S_1$ of delayed several lines portions through the delay circuit 56B. The selectors 55A to 55I are selectively switched in response to the control signal CT, and selects SD image data supplied from the register array 57 in accordance with corresponding indices, and supplies pixel data for nine pixels to a one-bit ADRC classification unit 58 at the next stage. In short, the class tap pattern of the classification unit 50B at the next stage is selected in accordance with the control signal CT.

The ADRC classification unit 58 uses a class tap pattern formed of nine taps selected by the selectors 55A to 55I to execute one-bit ADRC classification to output an ADRC code "c" represented in nine bits. As a result, the classification unit 50B provides 512 ($2^9$) types of different classes.

Consequently, as 16 classes provided by the first classification unit 50A is multiplied by 512 classes provided by the second classification unit 50B, the upconvertor 50 can classify a unit block of SD video signal into 8192 classes. By thus selecting an appropriate tap pattern by the ADRC classification at the next step in accordance with a class selected at the first step based on the spatial activity, a highly accurate classification can be accomplished at the next and subsequent steps, reflecting the spatial activity of the SD video signal.

A prediction value calculation unit 50C at the stage subsequent to the classification unit 50B is composed of a prediction coefficient RAM 59 for storing prediction coefficients for HD interpolated pixels, a prediction tap pattern setting unit 60 for setting a prediction tap pattern for producing HD interpolated pixels, and a prediction calculation unit 61 for producing HD interpolated pixels by executing calculations using the prediction tap pattern and a prediction coefficient.

A prediction coefficient is read from the prediction coefficient RAM 59 at a location indicated by address data using two signals consisting of an ADRC code "c" supplied from the one-bit ADRC classification unit 58 and a control signal CT delayed through the delay circuit 56B. The read prediction coefficient is supplied to the prediction calculation unit 61. On the other hand, the SD video signal $S_1$ sent from the register array 57 is output to the prediction tap pattern setting unit 60. The prediction tap pattern setting unit 60 sets a prediction tap pattern used for a prediction calculation unit 61 at the next stage. That is, from the inputted SD signal data $S_1$, the coefficient read from the prediction coefficient RAM and the prediction tap pattern executed prediction calculation at the prediction calculation unit 61 at the next stage are output. The prediction calculation unit 61 uses pixel data of the prediction tap pattern and the prediction coefficient to produce and output HD interpolated pixels by a linear first-order combination.

Here, four-bit control signal CT generated by the classification unit 50A, and a class tap pattern selected by the control signal CT and used at the classification unit 50B will be described.

FIG. 16 shows a table listing indexes "I0 to I3" indicating 16 ($2^4$) ways of different combinations of the four-bit control signal CT generated by the classification unit 50A. FIGS. 17A to 17D, 18A to 18D, 19A to 19D, and 20A to 20D show examples of tap pattern configurations of the classification unit 50B at the next stage provided corresponding to the indexes "I0 to I3". The relation between the control signal CT and the tap pattern, is a relation in which a class tap pattern in a large change direction (a direction of large laplacian value) in the spatial direction, and spatial wide of tap becomes smaller as a maximum of a laplacian value is large. Further the relation is that a tap pattern is composed of tap on the same field if a laplacian value in the temporal direction is large, and the tap pattern is composed of tap on a different field (for example, a frame) from the tap pattern if the laplacian value in the temporal direction is small.

Tap patterns shown in FIGS. 17A to 17D are set corresponding to indexes "0000" to "0011", respectively, and selected on a large change in the horizontal direction.

Figure 17A:
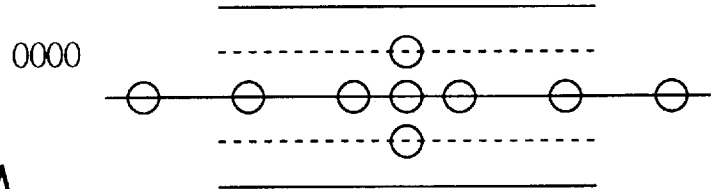
FIGS. 17A, 17B, 17C, and 17D are schematic diagrams explaining prediction tap patterns having a characteristic in a horizontal direction as a classification result of classification unit.
Figure 17B:
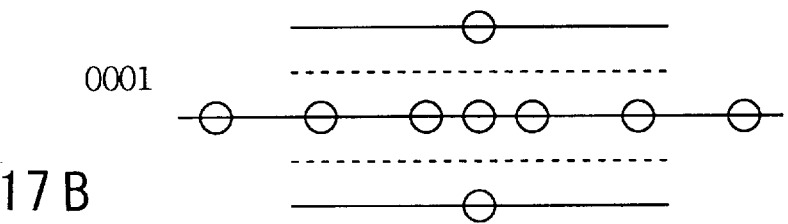
Figure 17C:
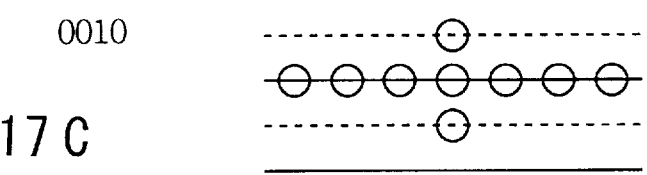
Figure 17D:
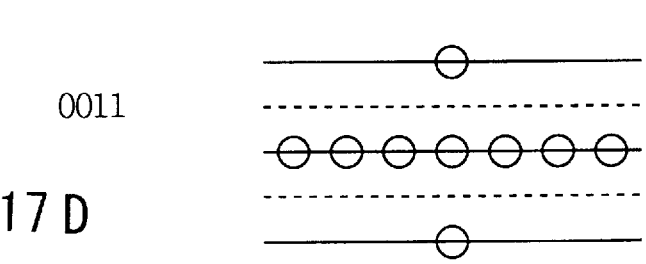

Comparing the class tap patterns shown in FIGS. 17A to 17D, it can be seen that the tap patterns for indexes "0010", "0011" shown in FIGS. 17C and 17D have pixels spaced at narrower intervals in the horizontal direction than the tap patterns for indexes "0000" and "0001" shown in FIGS. 17A and 17B, whereby the laplacian value of a maximum value in the horizontal direction is represented large. That is, the spatial wide of the class tap pattern becomes smaller as a laplacian value of a maximum value in the horizontal direction is large, also the spatial wide of the tap pattern becomes larger as the laplacian value of maximum value in horizontal direction is small. Also, as shown in FIGS. 17B and 17D, when bit (fourth bit) in the temporal direction of the indexes "0001" and "0011" is on, the associated class tap pattern is positioned in the same field to represent a large change in the temporal direction. On the contrary, as shown in FIGS. 17A and 17C, when bit (fourth bit) in the temporal direction of the indexes "0000" and "0010" is off, taps are positioned on different fields to represent a small change in the temporal direction.

Figure 18:
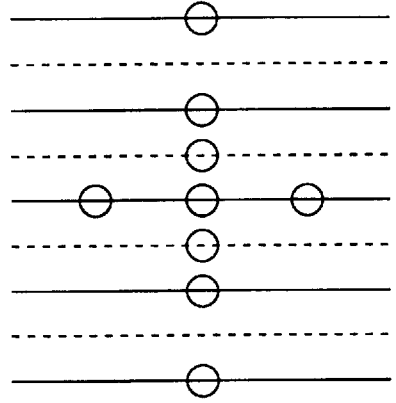
FIGS. 18A, 18B, 18C, and 18D are schematic diagrams explaining prediction tap patterns having a characteristic in a vertical direction as a classification result of classification unit.
Figure 18:
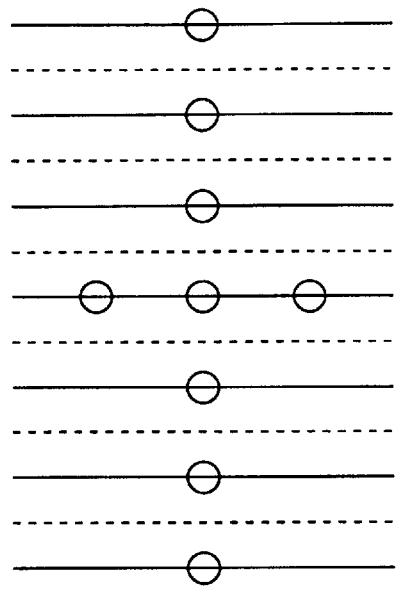
Figure 18:
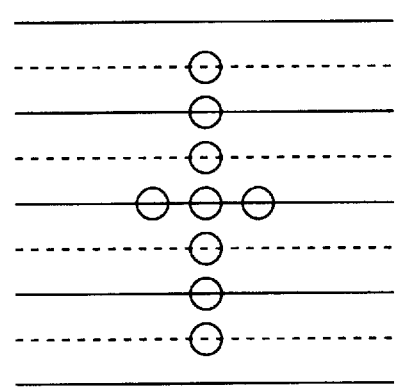
Figure 18:
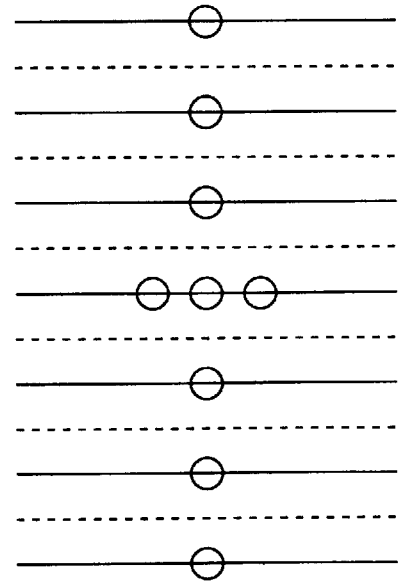

The class tap patterns for the indexes "0110" and "0111" shown in FIGS. 18C and 18D have pixels spaced at narrower intervals in the vertical direction than the class tap patterns for the indexes "0100" and "0101" shown in FIGS. 18A and 18B, whereby the laplacian value of a maximum value in the vertical direction is represented large. That is, the spatial wide of the class tap pattern is smaller as the laplacian value of a maximum value in the vertical direction is large, the spatial wide of the class tap pattern is larger as the laplacian value of a maximum value in the vertical direction is small. Also, as shown in FIGS. 18B and 18D, when there are changes in the temporal direction of the indexes "0101" and "0111", in other words when the bit (fourth bit) in the temporal direction is on, the class tap pattern is positioned in the same field to represent a large change in the temporal direction. On the contrary, as shown in FIGS. 18A and 18C, when the bit (fourth bit) in the temporal direction of the indexes "0100" and "0110" is off, taps are positioned on different fields to represent a small change in the temporal direction.

Figure 19A:
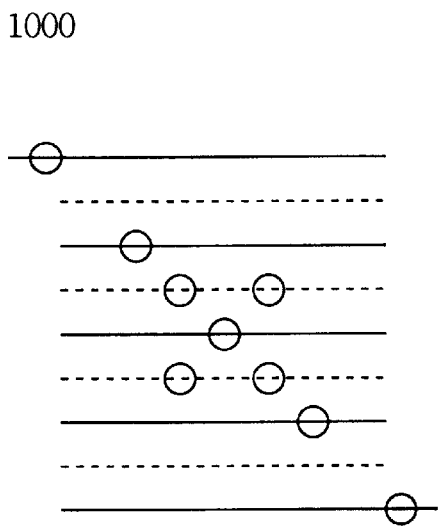
FIGS. 19A, 19B, 19C, 19D, 20A, 20B, 20C, and 20D are schematic diagrams explaining prediction tap patterns having a characteristic in an oblique direction as a classification result of classification unit.
Figure 19B:
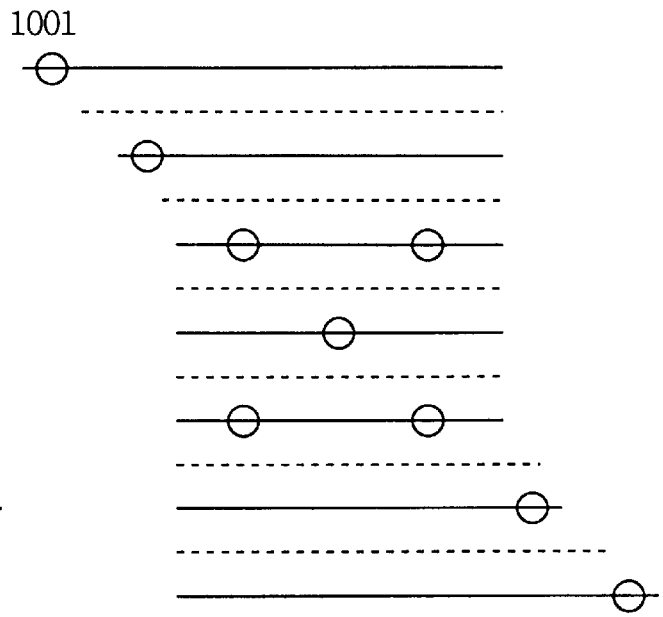
Figure 19C:
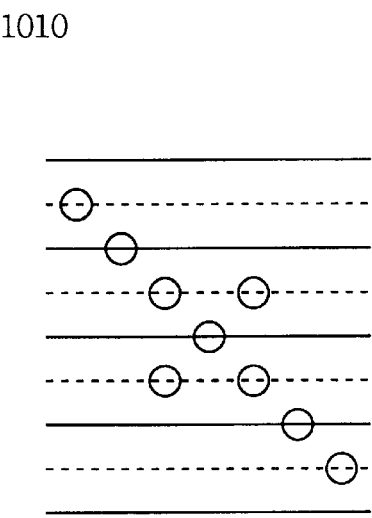
Figure 19D:
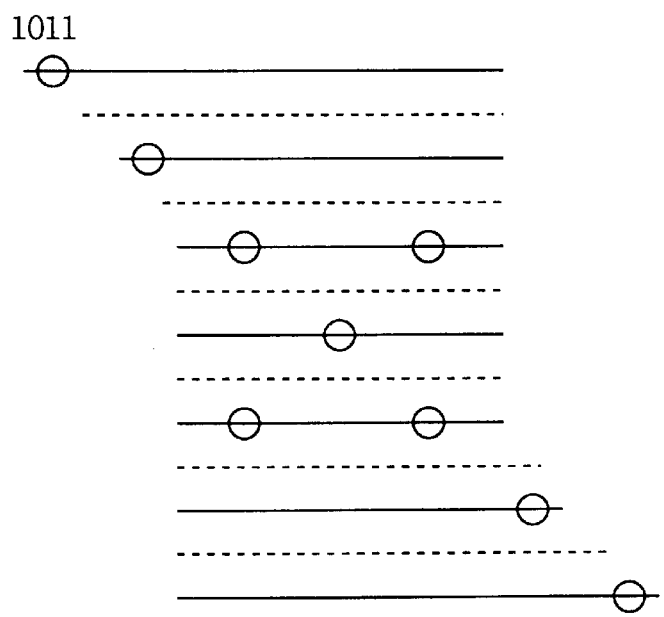

The class tap patterns for the indexes "1010" and "1011" shown in FIGS. 19C and 19D have pixels spaced at narrower intervals in the rightwardly declining oblique direction than the class tap patterns for the indexes "1000" and "1001" shown in FIGS. 19A and 19B, whereby a laplacian value of a maximum value in the rightwardly declining oblique direction is represented large. That is, the spatial wide of the class tap pattern is smaller as the laplacian value of a maximum value in the rightwardly declining oblique direction is large, the spatial wide of the class tap pattern is larger as the laplacian value of a maximum value in the rightwardly declining oblique direction is small. Also, as shown in FIGS. 19B and 19D, when bits in the temporal direction of the indexes "1001" and "1011" are on, the associated class tap pattern is positioned in the same field to represent a large change in the temporal direction. On the contrary, as shown in FIGS. 19A and 19C, when bits in the temporal direction of the indexes "1000" and "1010" are off, taps are positioned on different fields to represent a small change in the temporal direction.

Figure 20:
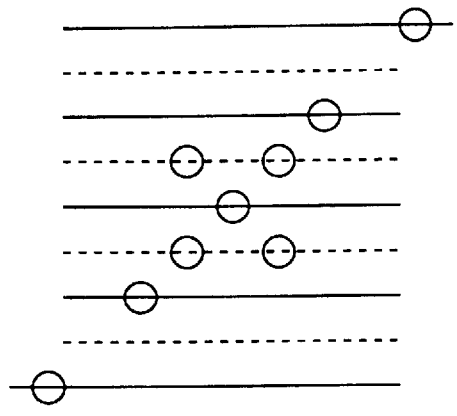
Figure 20:
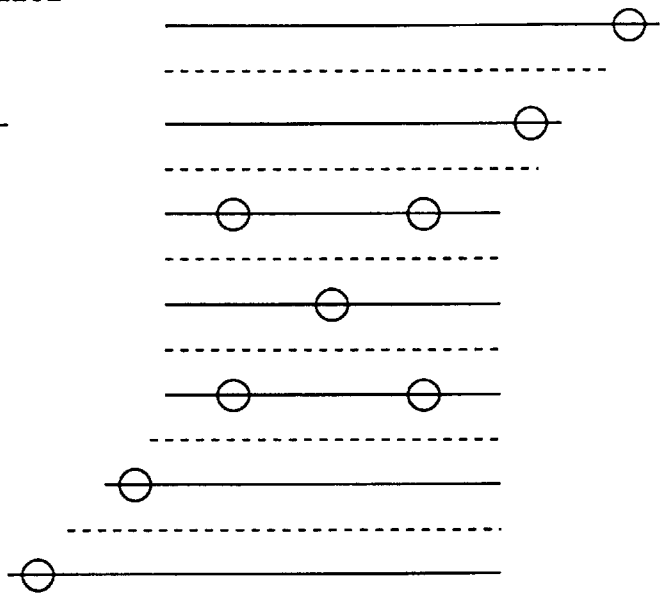
Figure 20:
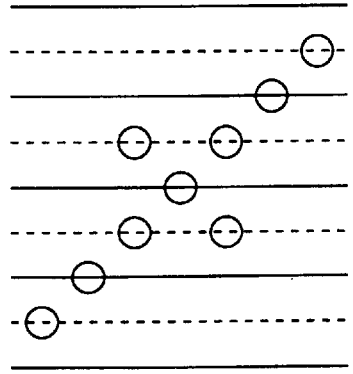
Figure 20:
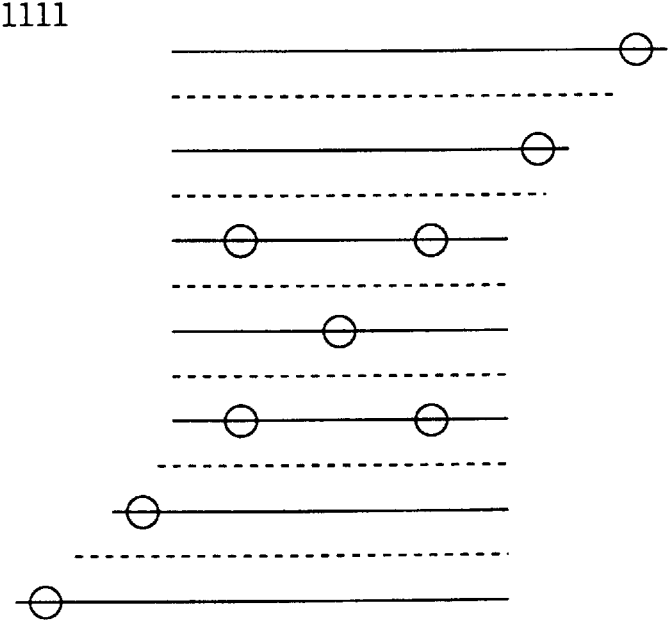

The class tap patterns for the indexes "1110" and "1111" shown in FIGS. 20C and 20D have pixels spaced at narrower intervals in the leftwardly declining oblique direction than the class tap patterns for the indexes "1101" and "1111" shown in FIGS. 20A and 20B, whereby a laplacian value of a maximum value in the leftwardly declining oblique direction is represented large. That is, the spatial wide of the class tap pattern is smaller as the laplacian value of a maximum value in the leftwardly declining oblique direction is large, and the spatial wide of the class tap pattern is larger as the laplacian value of a maximum value in the leftwardly declining oblique direction is small. Also, as shown in FIGS. 20B and 20D, when bits in the temporal direction of the indexes "1101" and "1111" are on, the associated class tap pattern is positioned in the same field to represent a large change in the temporal direction. On the contrary, as shown in FIGS. 20A and 20C, when bits in the temporal direction of the indexes "1100" and "1110" are off, taps are positioned on different fields to represent a small change in the temporal direction.

In this way, the class tap pattern, existing a class tap in large change direction (a direction of the large laplacian value) in the spatial direction, is set so that the spatial wide of the laplacian value is smaller as a maximum value of the laplacian value is large. Further, the class tap pattern is set so that the tap pattern is composed of taps in the same field if the laplacian value in the temporal direction is large, and the tap pattern is composed of taps on the different field (for example, a frame) from tap pattern if the laplacian value in the temporal direction is small.

Next, the foregoing upconvertor 50 of the sixth embodiment and the operation of each unit of the upconvertor 50 will be described. Upon inputting an SD video signal $S_1$ to the first classification unit 50A, the SD video signal $S_1$ is subjected to Laplacian filtering in a plurality of different level directions in the space by the Laplacian filters 51A to 51D. Absolute values a0 to a3 of the resulting Laplacian values L0 to L3 are calculated by the absolute value circuits 52A to 52D and outputted therefrom.

Then, the absolute values a0 to a3 are supplied to the maximum value detector 53 to detect a maximum value of the absolute values of the supplied laplacian values. The direction of an edge in the space of the inputted video signal is detected depending upon the direction of the Laplacian value L10 which has detected the maximum value. And the value a10 indicating the direction of the detected maximum value (detecting direction value of maximum value) is represented in two bit form. Further, the maximum value can be compared with a threshold to represent a flatness of the inputted SD video signal $S_1$, and the value representing the flatness (flatness value) L10 is represented in one bit form. Also, a laplacian value L4 in the temporal direction is determined by a laplacian filter 51E. Absolute value a4 of the laplacian value L4 is calculated by an absolute value circuit 52E and outputted therefrom. The absolute value a4 is compared with a threshold TH1 by a comparing circuit, thereby output as a value representing a change of the temporal direction (change value of temporal direction) all. In this way, the characteristic of the inputted SD video signal $S_1$ can be roughly revealed. The classification unit 50A supplies a four-bit control signal CT comprised of two-bit detecting direction value of a maximum value a10, one-bit flatness L10, and one-bit change value of the temporal direction all to the second classification unit 50B.

The classification unit 50B at the next stage sets a spatial class tap pattern on the basis of an index "I0 to I3" corresponding to the four-bit control signal CT. More specifically, the classification unit 50B switches the selectors 55A to 55I in response to the control signal CT, selects a class tap pattern determined to the input SD video signal SI supplied through the register array 57, and supplies the selected tap pattern to the ADRC classification unit 58. In this way, a highly accurate classification can be accomplished based on a class tap pattern reflecting the spatial activity of the SD video signal $S_1$, Also, the SD video signal $S_1$ is output from the register array 57 to the a prediction calculation unit 50C at the next stage. In a prediction tap pattern unit 60, a prediction coefficients read from a prediction coefficient RAM 59 in accordance with a control signal CT and an ADRC code "c", and a prediction tap pattern for executing a prediction calculation in the prediction calculation unit 61 are set, then the set prediction tap pattern is output to the prediction calculation unit 61. In the prediction calculation unit 61, a prediction calculation is executed by a linear first-order combination using the prediction coefficients read from the prediction coefficient RAM 59 in accordance with the control signal CT and the ADRC code "c", and the prediction tap pattern supplied from the prediction tap pattern unit 60, thus the HD interpolated pixels are output.

According to the configuration described above, the laplacian filters 51A to 51E in the first classification unit 50A execute a one-dimensional laplacian operations in plural directions to perform the first classification by synthetically deciding the values. Next, a class tap pattern of the second classification unit 50B is set in accordance with the result of the first classification unit 50A. Then the second classification unit 50B performs a classification using the class tap pattern. Therefore, a highly accurate classification of the SD video signal $S_1$ can be accomplished reflecting the spatial activity of the SD video signal $S_1$, thus producing similar effects to the foregoing embodiments.

(7) Seventh Embodiment

Figure 21:
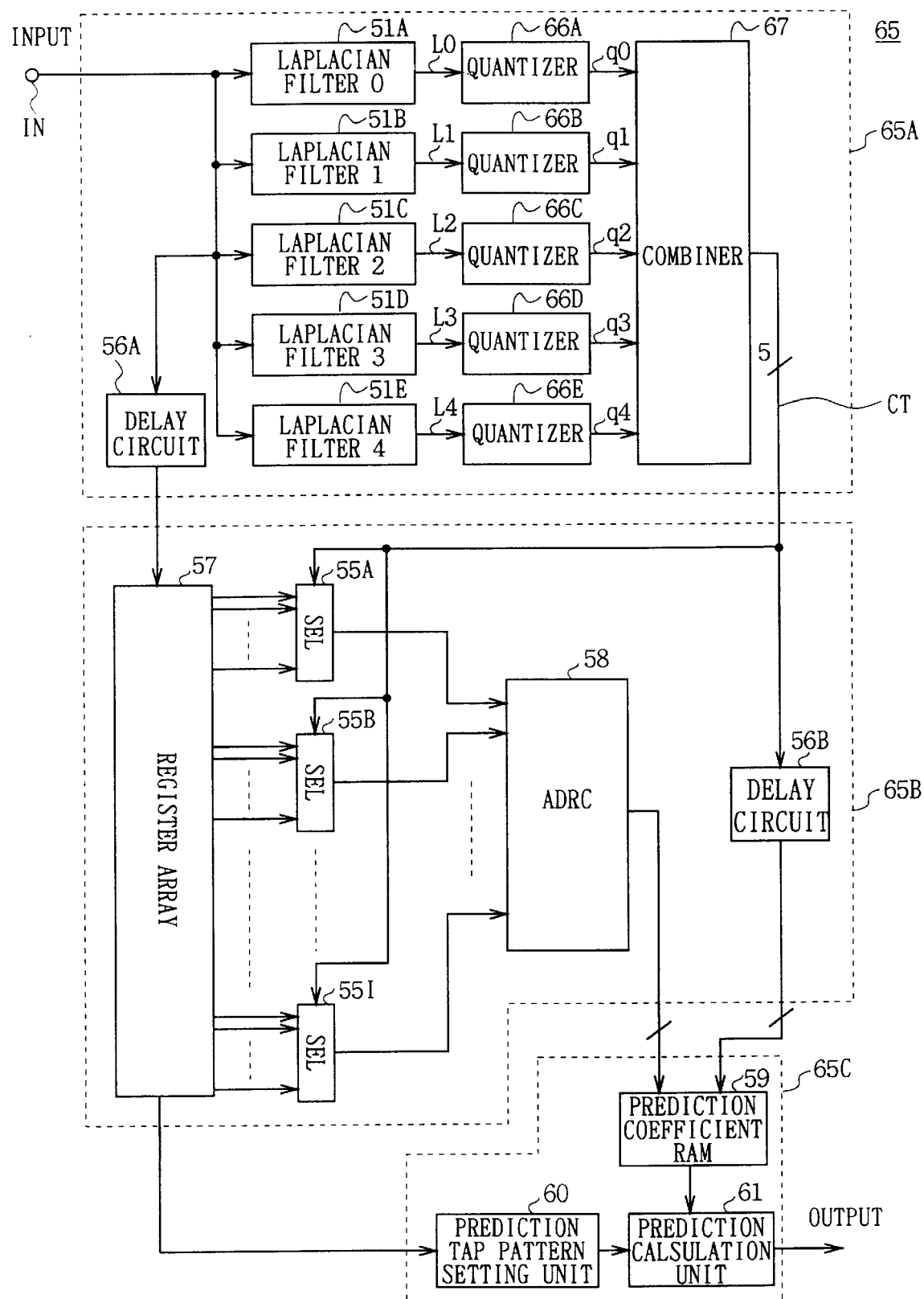
FIG. 21 is a block diagram explaining an upconvertor according to a seventh embodiment.

FIG. 21, where parts corresponding to those in FIG. 14 are designated the same reference numerals, shows an upconvertor 65 according to a seventh embodiment. In similar to the sixth embodiment, in the seventh embodiment, a class tap pattern for a classification of second classification unit 50B in accordance with the first classification using the laplacian filters 51A to 51E of the first classification 50A is set, and a second step classification is executed on the basis of the class tap pattern, thus realizing the classification at two steps.

The configuration of the upconvertor 65 in the sixth embodiment will be described using FIG. 21. An SD video signal $S_1$ inputted from an input terminal IN is supplied to a classification unit 65A. Then the SD video signal $S_1$ supplied to the classification unit 65A is respectively supplied to laplacian filters 51A to 51E and a delay unit 56A. Five laplacian filters 51A to 51E execute laplacian operations on the inputted SD video signal $S_1$ of a block of each frame or each field of the supplied SD video signal in the different directions for each filter, and output laplacian values L0 to L4. The laplacian filters 51A to 51E use same laplacian filters used in the upconvertor 50 in the sixth embodiment shown in FIG. 14. The laplacian filter values L0 to L4 are respectively supplied to quantizers 66A to 66E at the next stage.

The quantizers 66A to 66E calculate absolute values of corresponding Laplacians L0 to L4, and execute non-linear quantization to output quantized values q0 to q4. For example, if the quantizers 66A to 66E convert the input SD video signal $S_1$, by quantization, into quantized values q0 to q4 each of which represents one of two values such as "0" and "+1", the inputted SD video signal $S_1$ can be classified into a total of 32 ($2^5$) ways of different classes. That is, the quantizers quantize so as to assign a quantized value "0" in case of small absolute value, and assign a quantized value "1" in case of big absolute value. Then the quantized values q0 to q4 is supplied to a combiner 67, the combiner 67 combines the quantized values to generate a five-bit class code, and outputs the five-bit class code to a second classification unit 65B as a control signal CT representing first step classification.

The classification unit 65B switches selectors 55A to 55I on the basis of the control signal CT, similarly to the sixth embodiment, and selects a tap pattern composed of nine pixels which are SD pixels supplied through a register 57. The tap pattern composed nine pixels selected by the selectors 55A to 55I is supplied to an one-bit ADRC classification unit 58, and the one-bit ADRC classification unit 58 executes the second step classification to produce 512 ($2^9$) types of different class codes by executing an ADRC operation for the inputted class tap pattern. In this way, 16384 ways of different classes are accomplished by a combination of class of the first-step classification unit 65A and class of the second-step classification unit 65B. The ADRC classification unit 65 generates a nine-bit class code, and the nine-bit class code and the first-step class code supplied through the delay circuit 56B are supplied to the prediction value calculation unit 65C. The explanation of the calculation unit 65C is omitted because of similarity to the foregoing sixth embodiment. Also, figure of a class tap pattern used at the classification unit 65B according to a control signal CT supplied from the first classification unit 65A is omitted. However, as the class tap pattern, a tap pattern is set so that a spatial wide of a tap pattern is smaller and a tap is wider in the direction in which the laplacian value is large as a laplacian value is large. Also, the tap pattern is set so that the tap pattern is composed of tap on the same field in case where the laplacian value in the temporal direction is large, the tap pattern is composed of tap on a different field (for example, frame) in case where the laplacian value in the temporal direction is small. By foregoing configuration, it is possible to produce similar effects to the foregoing embodiments.

(8) Eighth Embodiment

Figure 22:
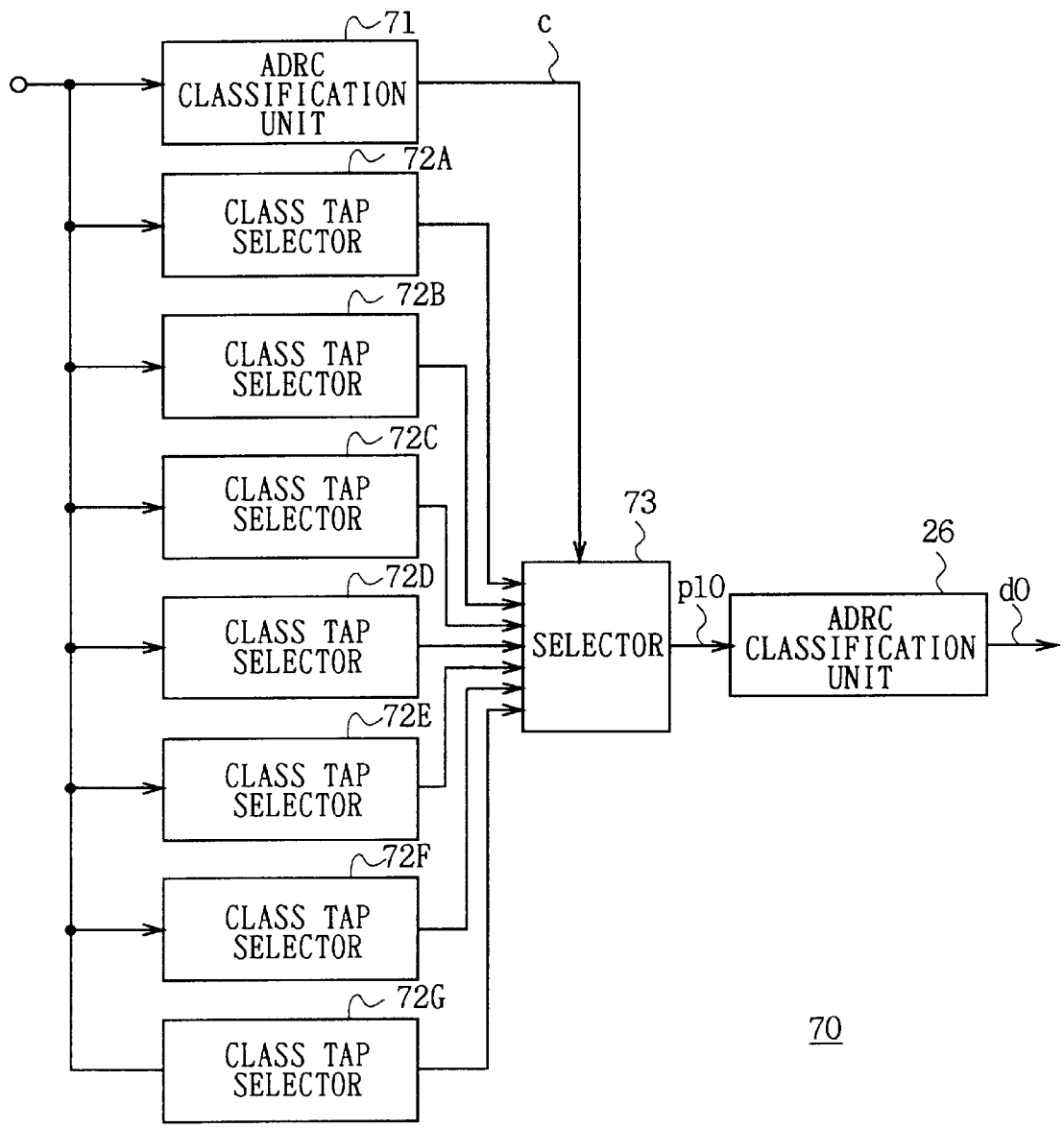
FIG. 22 is a block diagram explaining a classification unit according to an eighth embodiment.
Figure 23:
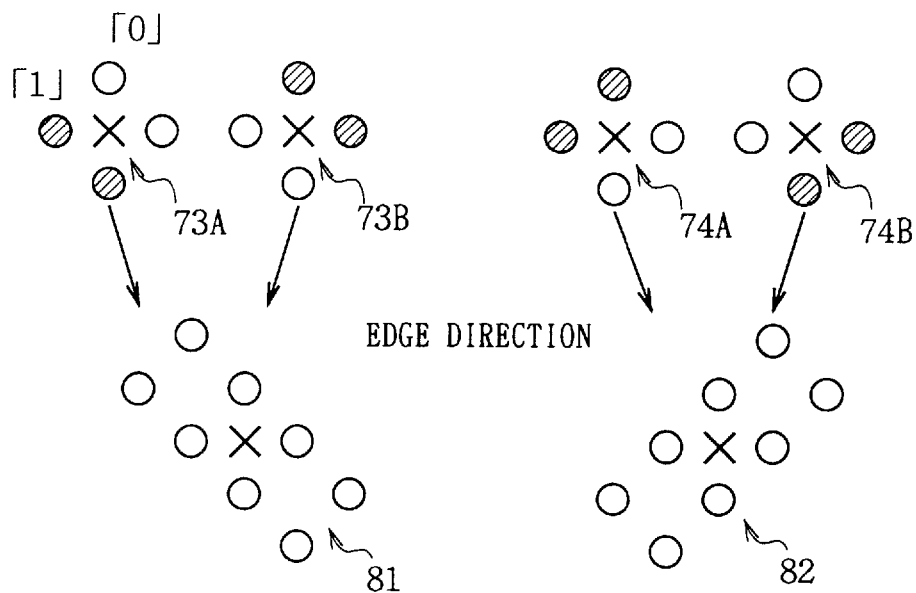
FIGS. 23A, 23B, 23C, and 23D are schematic diagrams explaining class tap patterns in classification units.
Figure 23:
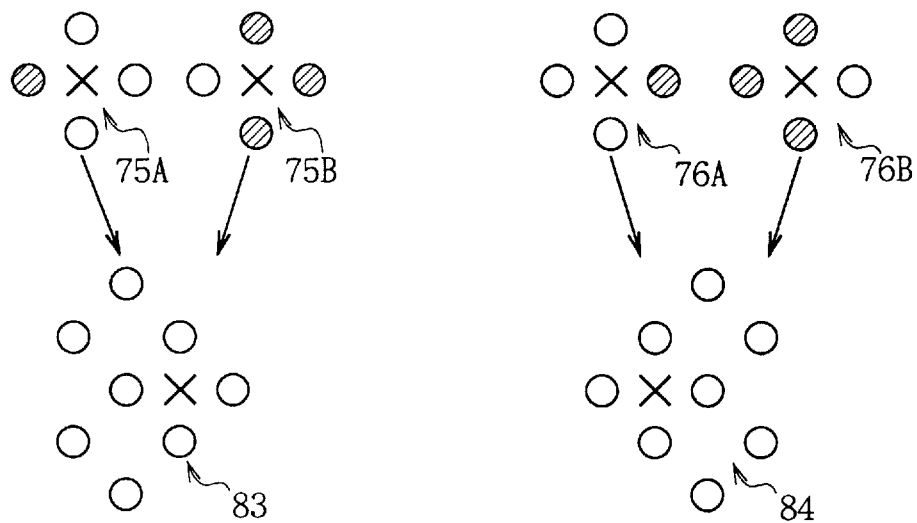
Figure 24:
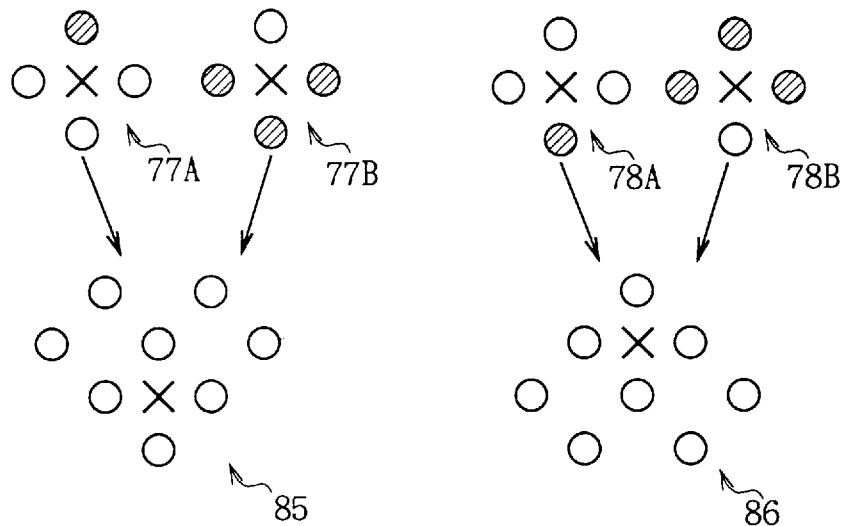
FIGS. 24A, 24B, and 24C are schematic diagrams explaining class tap patterns in classification units.
Figure 24:
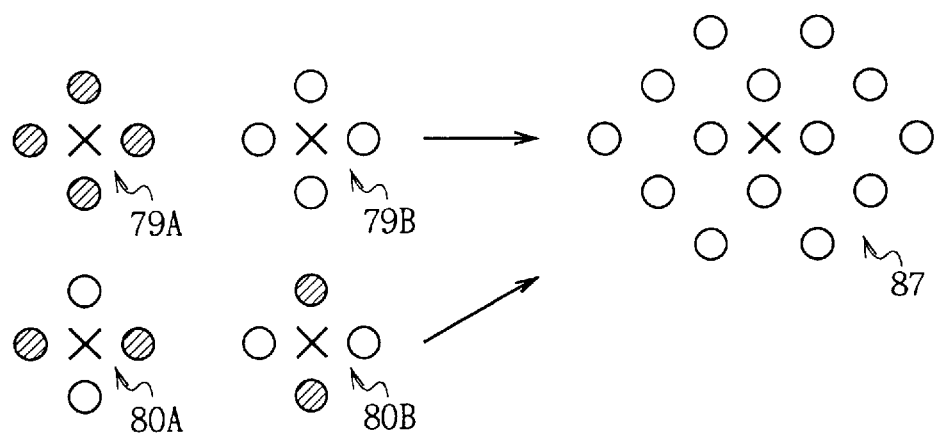

FIG. 22, where parts corresponding to those in FIGS. 4, 5 are designated the same reference numerals, shows a classification unit 70 of an upconvertor according to an eighth embodiment. An SD video signal $S_1$ inputted from an input terminal IN is parallelly supplied to an ADRC classification unit 71 and a plurality of class tap selectors 72 (72A to 72G). The ADRC classification unit 71 executes a classification of the inputted SD video signal $S_1$ in accordance with a pixel level distribution pattern by an ADRC operation using four pixels of around remarked pixel extracted from the inputted SD video signal $S_1$, and supplies a selector 73 with a resulting ADRC code "c". The selector 73 is also supplied with tap patterns classified as space classes by the class tap pattern selectors 72A to 72G each for setting a spatial class tap pattern determined in accordance with the characteristics of the inputted SD video signal $S_1$.

More specifically, for a level distribution (73A, 73B, 74A, 74B, 75A, 75B, 76A, 76B, 77A, 77B, 78A, 78B, 79A, 79B, 80A, 80B) indicated by each ADRC code "c" resulting from one-bit ADRC operation performed on every four pixels for around the remarked pixel of the inputted SD video signal $S_1$, each of the selectors 72A to 72G sets a class tap pattern (81, 82, 83, 84, 85, 86, 87) for representing the signal characteristics corresponding to the associated level distribution, as shown in FIGS. 23A, 23B, 23C, 23D, 24A, 24B, and 24C.

For example, level distributions 73A and 73B indicated by ADRC codes "c" respectively exhibit level distribution characteristics in a rightwardly declining direction (the direction of a diagonal from the upper left end to the lower right end on the plane of the drawing). Since an edge of the image is thought to exist in that direction, a class tap pattern 81 in the rightwardly declining oblique direction is corresponded to the level distributions 73A and 73B. Similarly, since level distributions 74A and 74B indicated by ADRC codes "c" respectively exhibit level distribution characteristics in a leftwardly declining direction (the direction of a diagonal from the upper right end to the lower left end on the plane of the drawing), a class tap pattern 82 in the leftwardly declining oblique direction is corresponded to the level distributions 74A and 74B. In addition, since level distributions 75A and 75B, 76A and 76B indicated by ADRC codes "c" exhibit level distribution characteristics offset on the left side and on the right side, respectively, class tap patterns 83 and 84 having prediction taps offset on the left side and on the right side are corresponded to the level distributions 75A and 75B, 76A and 76B, respectively.

Further, since level distributions 77A and 77B, 78A and 78B indicated by ADRC codes "c" exhibit level distribution characteristics offset on the upper side and on the lower side, respectively, class tap patterns 85, 86 having class taps offset on the upper side and on the lower side are corresponded to the level distributions 77A and 77B, 78A and 78B, respectively. Since level distributions 79A and 79B, 80A and 80B indicated by ADRC codes "c" exhibit regular level distribution characteristics, a class tap pattern 87 using all class tap is corresponded to the level distributions 79A and 79B, 80A and 80B, respectively.

In this way, a class tap pattern p10 is selected in the selector 73 in accordance with the ADRC codes "c" from the class tap patterns set in the tap pattern selectors 72A to 72G, and supplied to an ADRC classification unit 26 at the next stage. The ADRC classification unit 26 uses the selected prediction tap pattern p10 to perform a one-bit ADRC operation on the SD video signal $S_1$ and supplies a prediction coefficient ROM 14 with the resulting ADRC code d0 as address data for reading corresponding prediction coefficients.

Next, the operation of the classification unit 70 in the upconvertor in eighth embodiment will be described.

The inputted video signal $S_1$ is supplied to first ADRC classification unit 71, which executes an one-bit ADRC operation using four pixels for around the remarked pixel and produces a class code "c". Also, the inputted SD video signal $S_1$ is classified into a plurality of class tap patterns 81 to 87 reflecting the signal characteristics in the class tap pattern selectors 72A to 72G. Then a class tap pattern p10 is selected from the plurality of class tap patterns 81 to 87 in accordance with the class code "c" supplied from the first ADRC classification unit 71, and output to an ADRC classification unit 26 at the next stage. The ADRC classification unit 26 executes one-bit ADRC operation on the inputted SD video signal S1 formed the selected class tap pattern p10 to generate a class code d0 and supplies the class code d0 to the prediction coefficient ROM 14 as address data.

According to the configuration described above, for producing address data in order to select prediction coefficients, a class tap pattern is selected in accordance with the spatial activity of an inputted SD video signal $S_1$ detected by the ADRC classification unit 71 at the first stage. Then the second-step ADRC classification is executed by the ADRC classification unit 26 using the selected class tap pattern p10, so that the class code d0 reflecting the spatial activity of the inputted SD video signal $S_1$ can be generated, thus producing similar effects to the foregoing embodiments.

In addition, according to the embodiment described above, a prediction tap pattern used for a prediction calculation is changed in accordance with the spatial activity of the inputted SD video signal $S_1$, so that the calculation processing can be reduced when there are many prediction taps.

Further, as the first embodiment, number of quantization bits in second-stage ADRC classification unit 26 can be switched on the basis of the outputted signal outputted from first-stage ADRC classification unit 71.

(9) Ninth Embodiment

Figure 25:
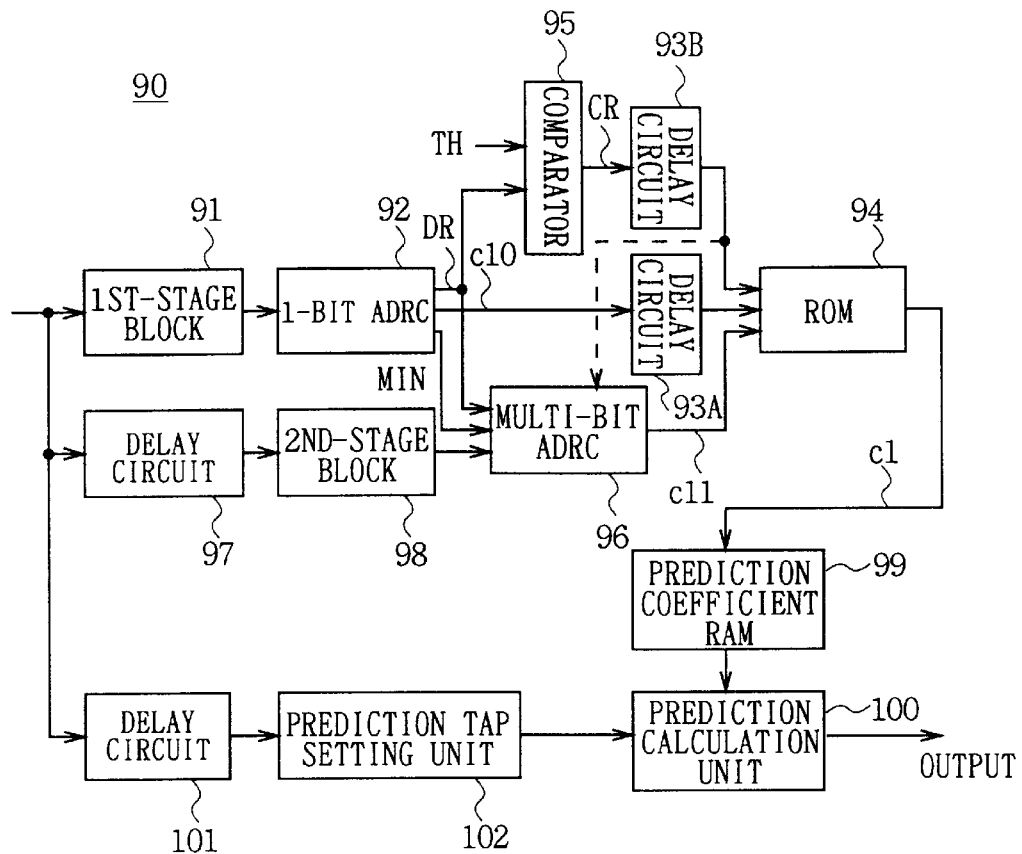
FIG. 25 is a block diagram explaining an upconvertor according to a ninth embodiment.

FIG. 25 shows an upconvertor 90 according to a ninth embodiment. The upconvertor 90 first execute a rough classification for an intra-space activity in accordance with a one-bit ADRC operation in a first-stage classification unit and then executes a multi-bit ADRC operation for a detailed classification in a second-stage classification unit.

In the upconvertor 90, a SD video signal $S_1$ inputted through an input terminal IN is respectively output to a first-stage block 91, delay circuits 97 and 101. The first-stage block 91 extracts a block of n×m pixels (for example, 5×5 pixels in FIG. 26) centered on a remarked pixel (indicated by "⊚" in FIG. 26) in a current frame or field of an SD video signal $S_1$ in a first-stage block 91 as shown in FIG. 26, and supplies a one-bit ADRC classification unit 92 with resulting block data b1.

The one-bit ADRC classification unit 92 executes a one-bit ADRC operation on the block data b1 consisting of 5×5 pixels and supplies a resulting ADRC code c10 to a ROM 94, after passing it through a delay circuit 93A for adjusting the timing. The one-bit ADRC classification unit 92 further supplies a comparator circuit 95 with a dynamic range DR calculated when the ADRC code c10 was derived. Simultaneously with this, the one-bit ADRC classification unit 92 supplies a multi-bit ADRC classification unit 96 with the dynamic range DR and a minimum pixel level MIN.

The comparator circuit 95 compares the dynamic range DR with a threshold TH and supplies the comparison result CR to the ROM 94 through a delay circuit 93B. The multi-bit ADRC classification unit 96 does not execute a classification based on the comparison result CR if the dynamic range DR is smaller than the threshold TH (CR equals "0"). On the other hand, the multi-bit ADRC classification unit 96 executes the classification if the dynamic range DR is larger than the threshold TH (CR equals "1"). However, in case of this embodiment, the multi-bit ADRC classification unit 96 is generally executed. Therefore in a ROM 94 at subsequent stage, an ADRC code c11 from the multi-bit ADRC classification unit 96 is ignored, thereby it is considered not to execute the multi-bit ADRC classification unit 94. Also, so as not to execute the multi-bit ADRC classification, the comparison result CR is supplied to the multi-bit ADRC classification unit 96 as shown a broken line in FIG. 25, thereby it has to be controlled not to make it execute the multi-bit ADRC classification unit 96.

Figure 26:
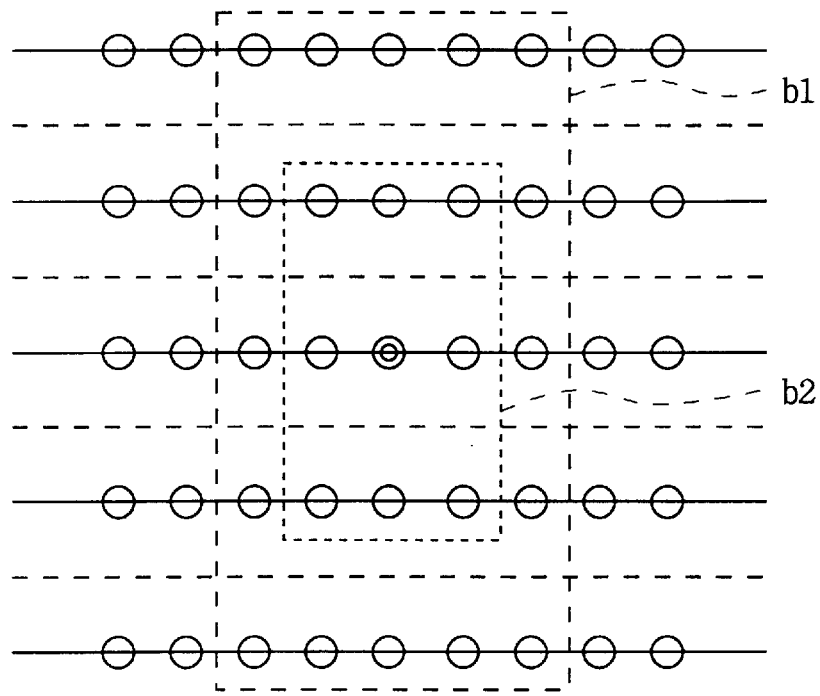
FIG. 26 is a schematic diagram explaining a class generating block data used for generating a class code in a classification unit according to an ninth embodiment.

The SD video signal $S_1$ delayed through the delay circuit 97 to have its timing adjusted is supplied to a second-stage block 98 which defines, for example, a block data b2 of nine pixel data consisting of 3×3 pixels including a remarked pixel, as shown in FIG. 26, which is supplied to the multi-bit ADRC classification unit 96. The multi-bit ADRC classification unit 96 uses the dynamic range DR and the minimum pixel level MIN calculated in one-bit ADRC classification unit 92 to classify the block data b2, and supplies a resulting ADRC code c11 to the ROM 94.

Figure 27:
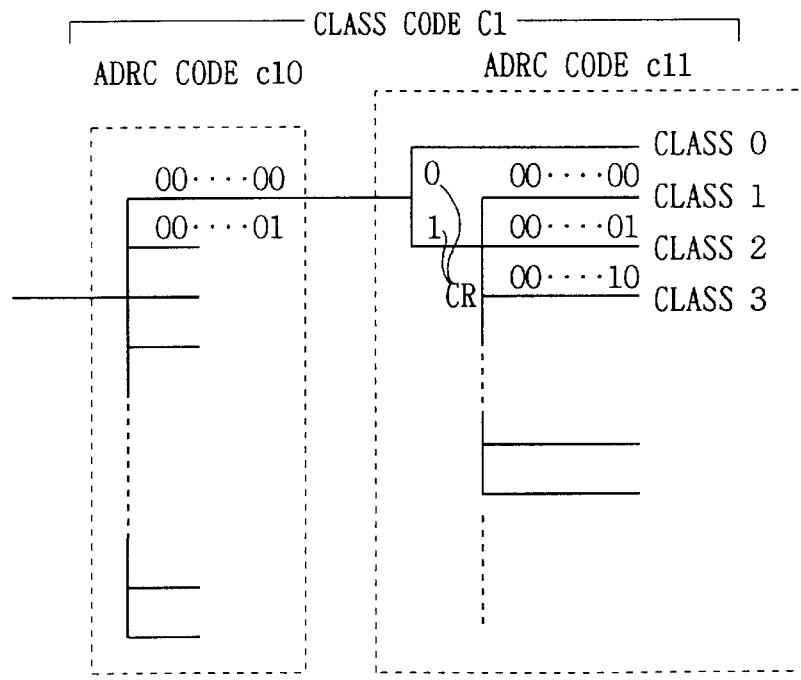
FIG. 27 is a schematic diagram explaining a hierarchical structure of class code according to an ninth embodiment.

As shown in FIG. 27, a table has been previously produced by learning for class code d0 having a hierarchical structure in accordance with the classification of ADRC code c10 derived as the result of the one-bit ADRC classification unit 92 and ADRC codes c11 derived as the result of the multi-bit ADRC classification unit 96, and has been stored in the ROM 94. The classification unit 90 reads a class code d0 in accordance with ADRC codes c10 and c11 derived by the one-bit ADRC classification unit 92 and the multi-bit ADRC classification unit 96 based on the comparison result CR, and supplies the read class code d0 to a prediction coefficient RAM 99 at the next stage. Likewise, prediction coefficients derived by learning are stored in the prediction coefficient RAM 99 in accordance with the class codes d0 arranged in a hierarchical structure.

Figure 28:
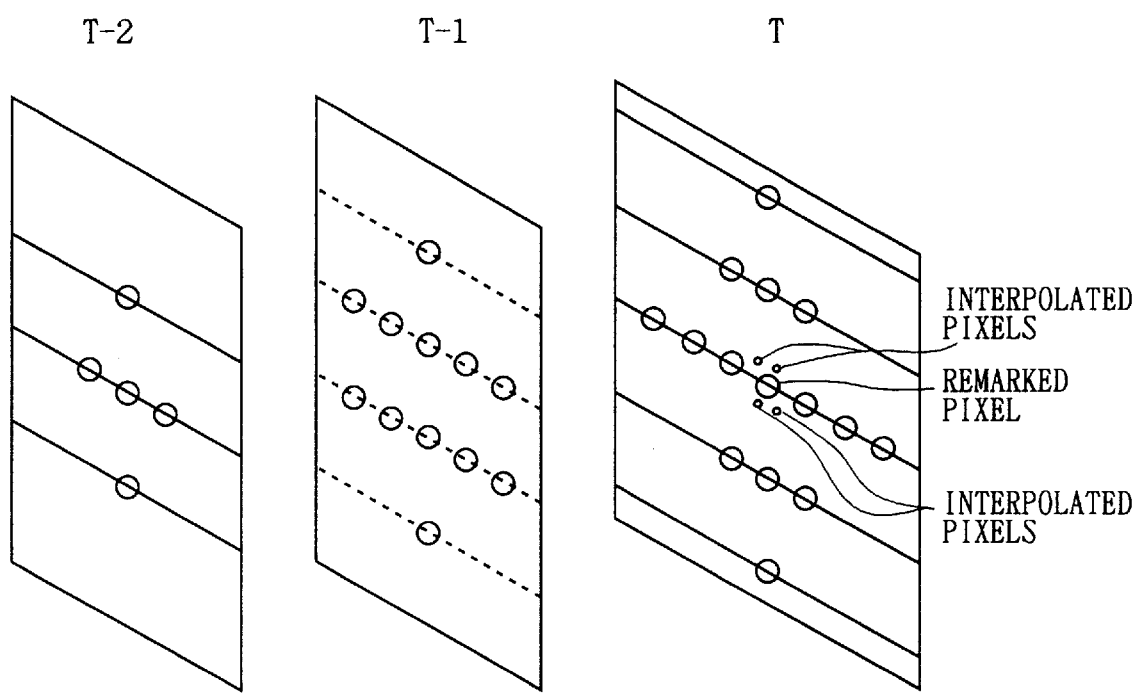
FIG. 28 is a schematic diagram explaining prediction tap patterns in a prediction calculation unit according to an ninth embodiment.

A set of prediction coefficients are sequentially read from the prediction coefficient RAM 99 with the class code d0 used as address data, and supplied to a prediction calculation unit 100 for calculating HD interpolated pixels by executing a product sum calculation with the SD video signal $S_1$. The prediction tap setting unit 102 is supplied with the SD video signal $S_1$ delayed through a delay circuit 101, and outputs a prediction tap pattern, as shown in FIG. 28, used in the prediction calculation unit 100 to the prediction calculation unit 100. The prediction tap setting unit 102 produces interpolated pixels using a prediction tap pattern as shown in FIG. 28. In this way, the prediction calculation unit 100 executes a linear prediction calculation with the group of prediction coefficients corresponding to the SD video signal $S_1$ to produce interpolated pixels.

Next, the upconvertor 90 according to the ninth embodiment and the operation of each unit of the upconvertor 90 will be described.

an SD video signal S1 inputted to the first-stage block 91 of the upconvertor 90 is extracted in the unit of 5×5 pixel blocks in which a remarked pixel is the center, and each pixel block is classified in the one-bit ADRC classification unit 92. Then, a dynamic range DR of each pixel block outputted from the one-bit ADRC classification unit 92 is compared with a predetermined threshold TH in the comparator circuit 95. At this time, if the dynamic range DR is larger than the threshold TH, the multi-bit ADRC classification unit 96 is executed. Then, a class cod d0 is read from the ROM 94 based on the results of the one-bit ADRC classification unit 92 and the multi-bit ADRC classification unit 96. On the contrary, if the dynamic range DR is smaller than the threshold TH, a class code is read from the ROM 94 based only on the result of the one-bit ADRC classification unit 92 without executing the multi-bit ADRC classification unit 96.

In this way, the class code d0 is read from the ROM 94 in accordance with the results of the one-bit ADRC classification unit 92 and/or the multi-bit ADRC classification unit 96, and supplied to the prediction coefficient RAM 99 as address data. The intra-space activity is roughly evaluated in the first-step classification and a detailed classification is executed in accordance with the intra-space activity at the second step, so that the inputted SD video signal $S_1$ can be appropriately classified reflecting the intra-spatial activity thereof.

A set of prediction coefficients are read from the prediction coefficient RAM 99 in accordance with the class code d0 and supplied to the prediction calculation unit 100. The prediction calculation unit 100 performs a prediction calculation using the prediction coefficients on the prediction tap pattern selected in the prediction tap pattern selector 102 to produce and output HD interpolated pixels.

According to the configuration described above, a rough classification is executed at the first step and a detailed classification is executed at the second step, so that an input SD video signal $S_1$ can be more appropriately classified in detail at the second step in accordance with the signal characteristics of the input SD video signal $S_1$ revealed by the first-step classification. This produces similar effects to the foregoing embodiments. In addition, if the classification is completed only at the first step, the entire classification processing can be reduced.

(10) Other Embodiments

While the foregoing embodiments have dealt with the case where an ADRC classification technique is used as a classification method based on compressed data of input video signal. However, the present invention is not limited to this, but classification can be executed by compressing data using other techniques including, for example, those employing DPCM (Differential Pulse Code Modulation), VQ (Vector Quantization) and MSB (Most Significant Bit), binarization, discrete cosine transform (DCT), and so on.

Also, while the foregoing embodiments have dealt with the case where the classification unit 12 executes the classification at two steps or at three steps. However, the present invention is not limited to the classification completed by such particular numbers of steps, but the classification can be executed at a larger number of steps if the adaptability is successively increased at subsequent steps after a rough classification at the first step. With a larger number of steps, a more accurate classification can be accomplished.

Figure 29:
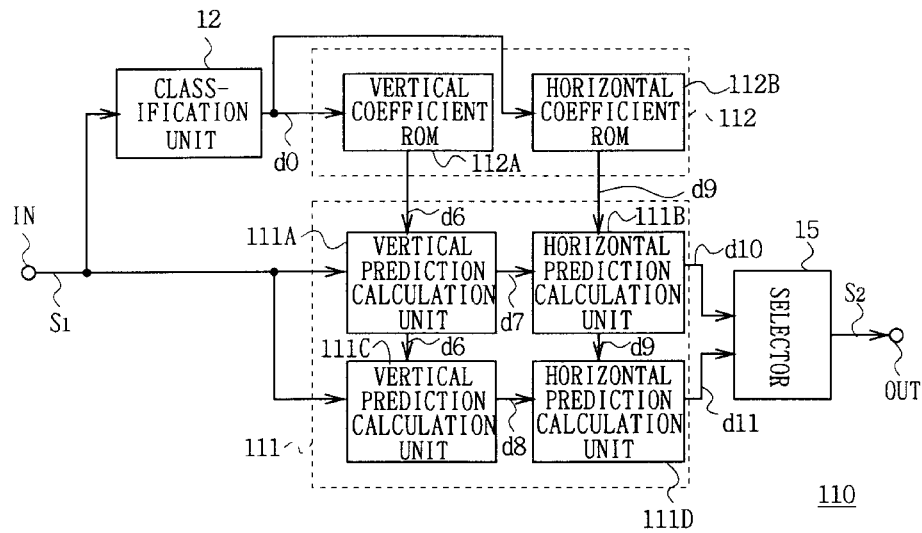
FIG. 29 is a block diagram showing an upconvertor based on a vertical/horizontal separable filter according to the present invention.

Further, while the foregoing embodiments have dealt with the case where a two-dimensional non-separable filter is used as an upconvertor. However, the present invention is not limited to this type of upconvertor, and can be applied to an upconvertor 110 comprising a vertical/horizontal separable filter configuration as illustrated in FIG. 29, where parts corresponding to those in FIG. 4 are designated the same reference numerals.

In the upconvertor 110, an SD video signal $S_1$ inputted through an input terminal IN is first supplied to a classification unit 12 and a prediction calculation unit 111. The prediction calculation unit 111 is divided into two sets: a vertical prediction calculation unit 111A and a horizontal prediction calculation unit 111B corresponding to positions mode 1 and mode 2 on a scanning line, respectively, and a vertical prediction calculation unit 111C and a horizontal prediction calculation unit 111D corresponding to positions mode 3 and mode 4 on a scanning line, respectively. The classification unit 12, as adapting the classification of the foregoing embodiment, generates a class code d0 in accordance with the inputted SD video signal $S_1$, which is supplied to a prediction coefficient ROM 112 serving as a storage means which previously stores tap prediction coefficients. The prediction coefficient ROM 112 is divided into a vertical coefficient ROM 112A for storing vertical components of tap prediction coefficients and a horizontal coefficient ROM 112B for storing horizontal components of the tap prediction coefficients. The class code d0 is supplied to each of the vertical coefficient ROM 112A and the horizontal coefficient ROM 112B.

First, a vertical prediction coefficient d6 outputted from the vertical coefficient ROM 112A is supplied to vertical prediction calculation units 111A and 111C. The vertical prediction calculation units 111A and 111C generate vertical estimated values d7 and d8 by a product sum calculation of the inputted SD video signal $S_1$ and the vertical prediction coefficient d6. The vertical estimated values d7 and d8 are supplied to horizontal prediction calculation units 111B and 111D at the next stage, respectively.

A horizontal prediction coefficient d9 generated from the horizontal coefficient ROM 112B is supplied to horizontal prediction calculation units 111B and 111D. The horizontal prediction calculation units 111B and 111D produce HD pixel signals d10 and d10 by performing a product sum calculation of the horizontal prediction coefficient d9 and the vertical estimated values d7 and d8. The HD pixel signals d10 and d11 are selectively supplied to a selector 15 where it is appropriately rearranged, whereby an HD signal $S_2$, which is a final output, is outputted from an output terminal OUT.

Figure 30:
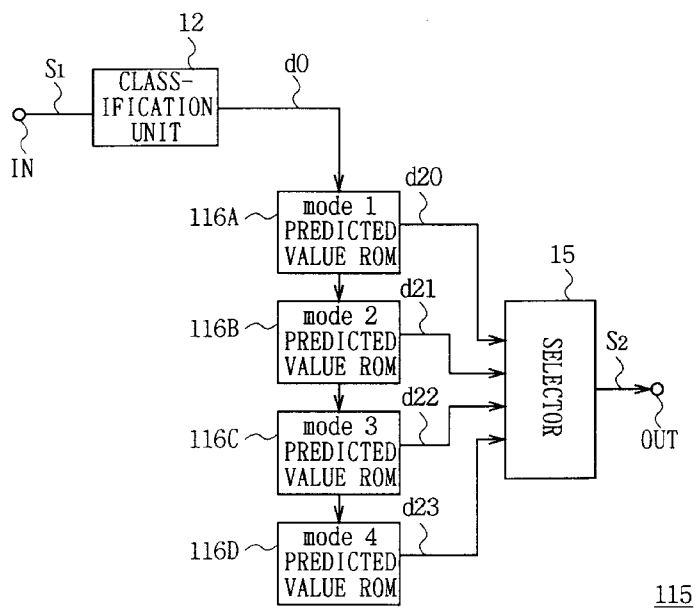
FIG. 30 is a block diagram showing an upconvertor for generating HD pixel signals based on prediction values according to the present invention.

Also, while the foregoing embodiments have dealt with the case where prediction coefficients, each representing a correlation between a re-marked SD pixel and transmitted pixels around the remarked pixel, are used to produce HD pixels around the remarked pixel from SD pixels. However, the present invention is not limited to this form of producing HD pixels, but, predicted values for HD interpolated pixels can be previously set for each class instead of the prediction coefficients, and stored in a storage means. Conversion of an SD video signal into an HD video signal using predicted values may be performed by an upconvertor 115 as shown in FIG. 30, where parts corresponding to those in FIG. 4 are designated the same reference numerals.

In the upconvertor 115, an SD video signal $S_1$ is supplied to a classification unit 12 through an input terminal IN. The classification unit 12 generates a class code d0 based on the characteristics of SD pixels around HD interpolated pixels which are interpolated pixels to be newly produced, and supplies the class code d0 to predicted value ROMs 116A to 116D. The predicted value ROMs 116A to 116D store predicted values constituting prediction data for HD interpolated pixels previously calculated by learning in correspondence to the class code d0 for each class. Predicted values d20 to d23 for HD interpolated pixels are read from the predicted value ROM 116 with the class code d0 used as address data, and outputted through a selector 15 to an output terminal OUT. In this way, it is possible to produce a high resolution video signal having the predicted values d20 to d23 used as HD interpolated pixels inserted into signal pixels constituting the inputted video signal $S_1$.

A first method for calculating the predicted values may be a learning method using a weighted average technique. The weighted average technique classifies re-marked pixels using SD pixels around the re-marked pixels, and divides a pixel value of remarked pixels (i.e., HD pixels) added up for each class by a frequency incremented in accordance with the number of remarked pixels. These operations are performed on a variety of images to derive predicted values.

A second method for calculating predicted values may be a learning method by normalization. This learning method first forms a block comprising a plurality of pixels including a remarked pixel, and utilizes a dynamic range in the block to normalize a value calculated by subtracting a reference value of the block from the pixel value of the re-marked pixel. Next, an accumulated value of the normalized values is divided by an accumulated frequency to derive a predicted value.

Further, in the foregoing embodiment, an intra-activity is evaluated for an inputted SD video signal, and tap pattern for executing classifications is selected on the basis of a result of the evaluation. However, the present invention is not limited thereto and an intra-activity is evaluated for an inputted SD video signal, and a prediction tap pattern calculated by a linear first-order combination of a prediction coefficient in a prediction calculation unit on the basis of the result of the evaluation. In this case, for example, a control signal CT supplied from the classification unit 50A shown in FIG. 14 is supplied to the prediction tap pattern unit 60 in the calculation unit 50C.

Further, in the foregoing embodiment, a prediction coefficient of a prediction coefficient memory is read on the basis of both a class code supplied from first-step classification unit and a class code supplied from second-step classification unit. However, the present invention is not limited thereto and a prediction coefficient of a prediction coefficient memory can be read using either a class code supplied from first-step classification unit or a class code supplied from second-step classification unit.

Furthermore, in the foregoing embodiment, an SD video signal is converted into an HD video signal. However, the present invention is not limited thereto and the SD video signal can be applied to the generation of interpolated pixels for enlarging and changing an image. Also, the SD video signal can be applied to a signal converting apparatus, such as an convertor for converting signals of NTSC method into signals of PAL (phase alternation by line), for converting signals of few number of pixels into signals of many number of pixels. Also, the SD video signal can be applied to YC separating apparatus for generating higher accuracy signals than former signals.

According to the present invention as described above, an intra-space activity is evaluated and classified for each block of an inputted video signal, and each block of the input video signal is classified at an appropriate number of steps in accordance with an activity code generated as a result of the classification. Thus, the activity code generated at the first step and the result of classifications at previous steps are reflected to classifications at next and subsequent steps, so that a highly accurate classification can be accomplished for the input video signal, and highly accurate interpolated pixels can be predicted and produced for a low resolution input image, using prediction coefficients or predicted values based on the results of the classifications, thereby enabling to realize the signal convertor and signal converting method which can produce a high resolution video signal.

In the limits of not deviating an opinion of the present invention, various changing and application example are considered. Therefore, summary of the present invention is not limited the embodiment.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claim is:

1. A signal converting apparatus for converting an input first video signal into a second video signal, comprising:

a unit for evaluating a spatial activity for said first video signal to generate an activity code;

a unit for setting a plurality of different patterns for said first video signal to select a pixel pattern from a set of pixel patterns determined by said spatial activity, and classifying said first video signal using the selected pixel pattern in order to generate a class code;

a memory stored with prediction coefficients for each class for predictively producing said second video signal; and a unit for producing said second video signal by predictively calculating said first inputted video signal using the prediction coefficient read out from said memory corresponding to at least the class code.

2. The signal converting apparatus according to claim 1, wherein said first video signal is a low resolution video signal, and said second video signal is a high resolution video signal which is higher resolution than said low resolution video signal.

3. The signal converting apparatus according to claim 1, wherein said second video signal is a video signal which has the number of pixels more than said first video signal.

4. The signal converting apparatus according to claim 1, wherein said activity code producing means evaluates an intra-space activity and a temporal direction activity for said first video signal to generate an activity code.

5. The signal converting apparatus according to claim 1, wherein said activity code producing means evaluates an intra-space activity using a dynamic range of each pixel in a neighboring region of a re-marked pixel in said first video signal in order to generate an activity code.

6. The signal converting apparatus according to claim 1, wherein said activity code producing means evaluates an intra-space activity in accordance with a level distribution of quantized value obtained based on a dynamic range defined by pixels in a neighboring region of a re-marked pixel in said first video signal in order to generate an activity code.

7. The signal converting apparatus according to claim 1, wherein said activity code producing means evaluates an intra-space activity using a standard deviation obtained from signal distribution of each pixel in a neighboring region of a remarked pixel in said first video signal in order to generate an activity code.

8. The signal converting apparatus according to claim 1, wherein said activity code producing means evaluates an intra-space activity in accordance with frequency distribution of quantized value obtained based on a dynamic range defined by pixels in a neighboring region of a re-marked pixel in said first video signal in order to generate an activity code.

9. The signal converting apparatus according to claim 1, wherein said activity code producing means evaluates an intra-space activity in accordance with frequency distribution of differences of respective adjacent pixel values for each pixel in a neighboring region of a re-marked pixel in said first video signal in order to generate an activity code.

10. The signal converting apparatus according to claim 1, wherein said activity code producing means evaluates an intra-space activity based on laplacian values obtained in respective intra-space different direction using laplacian filters in order to generate an activity code.

11. The signal converting apparatus according to claim 1, wherein said activity code producing means evaluates an intra-space activity and a temporal direction activity based on laplacian values obtained intra-space and temporal direction different directions using laplacian filters in order to generate an activity code.

12. The signal converting apparatus according to claim 1, wherein said activity code producing means evaluates an intra-space activity in accordance with level distribution of each pixel in a neighboring region of a re-marked pixel in said first video signal in order to generate an activity code.

13. A signal converting apparatus for converting an input first video signal into a second video signal, comprising:

a unit for evaluating a spatial activity for said first video signal to generate an activity code;

a unit for classifying said first video signal by quantizing said first video signal to generate a class code, said unit for classifying adaptively changing a level resolution capability when quantizing said first video signal in accordance with said activity code;

a memory storing prediction coefficients for each class for productively producing said second video signal;

a unit for producing said second video signal by predictively calculating said first inputted video signal using the prediction coefficient read out from said memory corresponding to at least the class code.

14. The signal converting apparatus according to claim 4, wherein said class code producing means sets a pixel pattern for a wide region, a pixel pattern for a narrow region as compared with said wide region, and a standard pixel pattern correspond to between said wide region and said narrow region, for said first video signal.

15. The signal converting apparatus according to claim 1, wherein:

said activity code producing means quantizes each pixel in a neighboring region of a remarked pixel in said first video signal to compress data and evaluates an intra-space activity in accordance with characteristics of a level distribution for the quantized value in order to produce said activity code; and said class code producing means sets an adaptive pixel pattern in accordance with said activity code, and sets predetermined number of bits for each pixel of the pixel pattern in accordance with said activity code to quantize it.

16. A signal converting apparatus for converting an inputted first video signal into a second video signal, comprising:

a unit for evaluating a spatial activity for said first video signal to generate an activity code;

a unit for setting a plurality of different patterns for said first video signal to select a pixel pattern from a set of pixel patterns in accordance with said activity code, and classifying said first video signal using the selected pixel pattern in order to generate a class code;

a memory storing a prediction value for each class for predictively producing said second video signal; and a unit for producing said second video signal in accordance with the prediction value read out from said memory corresponding to at least the class code.

17. The signal converting apparatus according to claim 16, wherein said first video signal is a low resolution video signal, and said second video signal is a high resolution video signal which is higher resolution than said low resolution video signal.

18. The signal converting apparatus according to claim 16, wherein said second video signal is a video signal which has the number of pixels more than said first video signal.

19. The video signal converting apparatus according to claim 16, wherein said activity code producing means evaluates an intra-space activity and temporal direction activity for said first video signal in order to generate an activity code.

20. A video signal converting method for converting an inputted first video signal into a second video signal different from said first video signal, comprising the steps of:

evaluating an intra-space activity for said first video signal to generate an activity code;

performing stepwise classification based on said activity code to generate a class code based on the result of the classification;

reading out a prediction coefficient stored in a prediction coefficient memory for predictively producing said second video signal, using said first video signal in accordance with said activity code and/or said class code;

performing a prediction calculation for said first inputted video signal using the read out prediction coefficient; and outputting a prediction calculation value as said second video signal, wherein said class code is generated by setting a plurality of different pixel patterns for said first video signal to select a pixel pattern from the plurality of pixel patterns in accordance with said activity code and classifying said first video signal using the selected pixel pattern.

21. The signal converting method according to claim 20, wherein said first video signal is a low resolution video signal, and said second video signal is a high resolution video signal which is higher resolution than said low resolution video signal.

22. The signal converting method according to claim 20, wherein said second video signal is video signal which has the number of pixels more than said first video signal.

23. The signal converting method according to claim 20, wherein said activity code producing step evaluates an intra-space activity and a temporal direction activity for said first video signal.

24. The signal converting method according to claim 20, wherein said activity code producing step evaluates an intra-space activity using a dynamic range for each pixel in a neighboring region of a remarked pixel in said first video signal.

25. The signal converting method according to claim 20, wherein said activity code producing step evaluates an intra-space activity in accordance with a level distribution for quantized value obtained based on a dynamic range defined by pixels in a neighboring region of a re-marked pixel in said first video signal.

26. The signal converting method according to claim 20, wherein said activity code producing step evaluates an intra-space activity using a standard deviation obtained from a signal distribution of each pixel in a neighboring region of a re-marked pixel in said first video signal.

27. The signal converting method according to claim 20, wherein said activity code producing step evaluates an intra-space activity in accordance with a frequency distribution for a quantized value obtained based on a dynamic range defined by pixels in a neighboring region of a remarked pixel in said first video signal.

28. The signal converting method according to claim 20, wherein said activity code producing step evaluates an intra-space activity in accordance with a frequency distribution of differences of respective adjacent pixel values for each pixel in a neighboring region of a remarked pixel in said first video signal.

29. The signal converting method according to claim 20, wherein said activity code producing step evaluates an intra-space activity based on a laplacian value obtained in respective intra-space different directions using laplacian filters.

30. The signal converting method according to claim 23, wherein said activity code producing step evaluates an intra-space activity and a temporal direction activity based on a laplacian value respectively obtained in intra-space direction and temporal direction different directions using laplacian filters.

31. The signal converting method according to claim 20, wherein said activity code producing step evaluates an intra-space activity in accordance with a level distribution in a neighboring region of a re-marked pixel in said first video signal.

32. A video signal converting method for converting an inputted first video signal into a second video signal different from the first video signal, comprising the steps of:

evaluating an intra-space activity for said first video signal to generate an activity code;

performing stepwise classification based on said activity code to generate a class code based on the result of the classification;

reading out a prediction coefficient stored in a prediction coefficient memory for predictively producing said second video signal, using said first video signal in accordance with said activity code and/or said class code;

performing a prediction calculation for said first inputted video signal using the read out prediction coefficient; and outputting a prediction calculation value as said second video signal wherein said class code is generated by classifying said first video signal by quantizing said first video signal based on a dynamic range defined by each pixel in a neighboring region of a re-marked pixel in said first video signal, and wherein said class code is further generated by changing a resolution level when quantizing said first video signal in accordance with said activity code.

33. The signal converting method according to claim 23, wherein said class code producing step sets a pixel pattern for a wide region, a pixel pattern for a narrow region as compared with said wide region, and a standard pixel pattern corresponding to between said wide region and said narrow region, for said first video signal.

34. The signal converting method according to claim 23, wherein:

said activity code producing step quantizes each pixel in a neighboring region of a re-marked pixel in said first video signal to compress data and evaluates an intra-space activity in accordance with characteristics of a level distribution for the quantized value; and said class code producing step sets an adaptive pixel pattern in accordance with said activity code, and sets predetermined number of bits for each pixel of the pixel pattern in accordance with said activity code to quantize it.

35. A signal converting method for converting an inputted first video signal into a second video signal different from the first video signal, comprising the steps of:

evaluating an intra-space activity for said first video signal and outputting an activity code;

performing stepwise classification based on said activity code and outputting a class code based on a result of the classification;

reading a prediction value stored in a prediction value memory in accordance with said activity code and/or said class code; and outputting said prediction value produced as an interpolated pixel signal for said first video signal wherein said activity code is produced by setting a plurality of different pixel patterns for said first video signal, selecting a pixel pattern from the plurality of pixel patterns in accordance with said activity code, and classifying said first video signal using the selected pixel pattern.

36. The signal converting apparatus according to claim 35, wherein said first video signal is a low resolution video signal, and said second video signal is a high resolution video signal which is higher resolution than said low resolution video signal.

37. The signal converting method according to claim 35, wherein said second video signal is a video signal which has the number of pixels more than said first video signal.

38. The signal converting method according to claim 35, wherein said activity code producing step evaluates an intra-space activity and a temporal direction activity for said first video signal.

39. A signal converting apparatus for converting an input first video signal into a second video signal, comprising:

a unit for evaluating a spatial and temporal activity for said first video signal to generate an activity code;

a unit for selecting a plurality of pixels in accordance with said activity, and classifying said first video signal using the plurality of pixels in order to generate a class code;

a memory stored with prediction coefficients for each class for predictively producing said second video signal; and a unit for producing said second video signal by calculating said first video signal using the prediction coefficient read out from said memory corresponding to at least the class code.

40. A signal converting apparatus according to claim 39, wherein said unit for producing produces said second video signal by calculating said first video signal using the prediction coefficient read out from said memory corresponding to the class code and the activity code.

41. A signal converting apparatus according to claim 40, wherein said first video signal is a low resolution video signal, and said second video signal is a high resolution video signal which is of higher resolution than said low resolution video signal.

42. A signal converting apparatus according to claim 41, wherein said second video signal is a video signal which has a greater number of pixels than said first video signal.

43. A signal converting apparatus according to claim 41, wherein said prediction coefficients for each class are generated by learning said second video signal.

44. The signal converting apparatus according to claim 1, wherein said unit for producing produces said second video signal by calculating said first video signal using the prediction coefficient read out from said memory corresponding to the class code and the activity code.

45. The signal converting apparatus according to claim 44, wherein said prediction coefficients for each class are generated by learning the second video signal.

46. The signal converting apparatus according to claim 13, wherein said unit for producing produces said second video signal by calculating said first video signal using the prediction coefficient read out from said memory corresponding to the class code and the activity code.

47. The signal converting apparatus according to claim 46, wherein said prediction coefficients for each class are generated by learning the second video signal.

48. The signal converting apparatus according to claim 13, wherein said unit for classifying classifies said first video signal by quantizing said video signal on the basis of a dynamic range defined by each pixel in a neighboring region of a remarked pixel in said first video signal to generate said class code.

49. The signal converting apparatus according to claim 48, wherein said unit for producing produces said second video signal by calculating said first video signal using the prediction coefficient read out from said memory corresponding to the class code and the activity code.

50. The signal converting apparatus according to claim 49, wherein said prediction coefficients for each class are generated by learning the second video signal.

51. A method for converting an input first video signal into a second video signal, comprising the steps of:

evaluating a spatial and temporal activity for said first video signal to generate an activity code;

selecting a plurality of pixels in accordance with said activity, and classifying said first video signal using the plurality of pixels in order to generate a class code; and producing said second video signal with prediction coefficients stored for each class in a memory for predictively calculating said first video signal using the prediction coefficient read out from said memory corresponding to at least the class code for producing said second video signal.

52. A method according to claim 51, wherein said second video signal is produced by calculating said first video signal using the prediction coefficient read out from said memory corresponding to the class code and the activity code.

53. A method according to claim 51, wherein said first video signal is a low resolution video signal, and said second video signal is a high resolution video signal which is of higher resolution than said low resolution video signal.

54. The method according to claim 51, wherein said second video signal has a greater number of pixels than said first video signal.

55. The method according to claim 51, wherein said prediction coefficients for each class are generated by learning the second video signal.

* * * * *